United States Patent
Minami et al.

(10) Patent No.: US 10,968,299 B2
(45) Date of Patent: Apr. 6, 2021

(54) COPOLYMER AND AQUEOUS COATING COMPOSITION USING SAME

(71) Applicant: ADEKA CORPORATION, Tokyo (JP)

(72) Inventors: Eiji Minami, Tokyo (JP); Naoki Tsukahara, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 49 days.

(21) Appl. No.: 15/518,555

(22) PCT Filed: Nov. 25, 2015

(86) PCT No.: PCT/JP2015/083057
§ 371 (c)(1),
(2) Date: Apr. 12, 2017

(87) PCT Pub. No.: WO2016/093060
PCT Pub. Date: Jun. 16, 2016

(65) Prior Publication Data
US 2017/0247488 A1  Aug. 31, 2017

(30) Foreign Application Priority Data

Dec. 12, 2014 (JP) .............................. JP2014-251736

(51) Int. Cl.
| | | |
|---|---|---|
| C08F 220/34 | (2006.01) | |
| C08F 218/10 | (2006.01) | |
| C08F 220/12 | (2006.01) | |
| C09D 7/40 | (2018.01) | |
| C09D 201/00 | (2006.01) | |
| C09D 7/65 | (2018.01) | |
| C08L 33/14 | (2006.01) | |

(52) U.S. Cl.
CPC .......... *C08F 220/12* (2013.01); *C08F 220/34* (2013.01); *C09D 7/40* (2018.01); *C09D 7/65* (2018.01); *C09D 201/00* (2013.01); *C08L 33/14* (2013.01)

(58) Field of Classification Search
CPC .............................. C08F 220/34; C08F 218/10
See application file for complete search history.

(56) References Cited

U.S. PATENT DOCUMENTS

| | | | | |
|---|---|---|---|---|
| 2009/0105419 A1* | 4/2009 | Mukuda | ..................... | C08F 2/26 525/187 |
| 2009/0264585 A1* | 10/2009 | Avramidis | ................ | C08F 2/24 524/563 |

FOREIGN PATENT DOCUMENTS

| | | |
|---|---|---|
| EP | 0 516 201 | 4/1992 |
| EP | 0 729 493 | 9/1996 |
| EP | 1 055 687 | 11/2000 |
| EP | 1055687 A2 * | 11/2000 ............ C08F 220/12 |
| EP | 1 911 808 | 4/2008 |
| JP | 3-46506 | 7/1991 |

(Continued)

OTHER PUBLICATIONS

Extended European Search Report dated May 3, 2018 in European Application No. 15867318.6.
International Preliminary Report on Patentability dated Jun. 13, 2017 in International (PCT) Application No. PCT/JP2015/083057.
International Search Report dated Feb. 23, 2016 in International (PCT) Application No. PCT/JP2015/083057.

*Primary Examiner* — Karuna P Reddy
(74) *Attorney, Agent, or Firm* — Wenderoth, Lind & Ponack, L.L.P.

(57) ABSTRACT

The present invention is a copolymer containing, as essential structural units, unit A represented by Formula (1) and unit B represented by Formula (2):

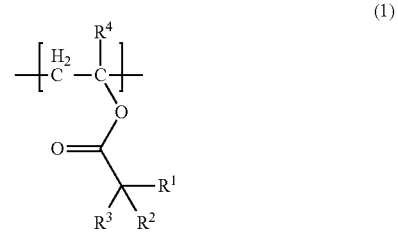

(1)

(wherein $R^1$ and $R^4$ each independently represent a hydrogen atom or a methyl group, and $R^2$ and $R^3$ each independently represent a hydrogen atom or a C1-20 hydrocarbon group, excluding cases where two or more groups of $R^1$ to $R^3$ are hydrogen atoms.)

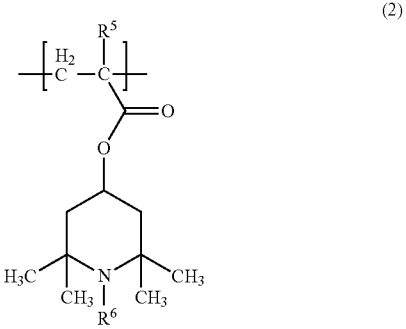

(2)

(wherein $R^5$ represents a hydrogen atom or a methyl group, and $R^6$ represents a group selected from the group consisting of C1-20 hydrocarbon groups optionally containing an oxygen atom, C1-20 alkoxy groups, hydrogen atoms, oxygen radicals and hydroxyl groups.)

9 Claims, No Drawings

(56) References Cited

FOREIGN PATENT DOCUMENTS

| | | |
|---|---:|---:|
| JP | 04-216807 | 8/1992 |
| JP | 05-043831 | 2/1993 |
| JP | 5-117578 | 5/1993 |
| JP | 11-286564 | 10/1999 |
| JP | 2000-072946 | 3/2000 |
| JP | 2001-49078 | 2/2001 |
| JP | 2001-49165 | 2/2001 |
| JP | 2001-81358 | 3/2001 |
| JP | 2001-323209 | 11/2001 |
| JP | 2002-201420 | 7/2002 |
| JP | 2002-302638 | 10/2002 |
| JP | 2003-253194 | 9/2003 |
| JP | 2004-256582 | 9/2004 |
| JP | 2004-277492 | 10/2004 |
| JP | 2004-292748 | 10/2004 |
| JP | 2005-272727 | 10/2005 |
| JP | 2007-254623 | 10/2007 |
| JP | 2009-91529 | 4/2009 |
| JP | 2009-144047 | 7/2009 |
| JP | 2009-280675 | 12/2009 |
| JP | 2009-292886 | 12/2009 |
| JP | 2010-229167 | 10/2010 |
| JP | 4604048 | 12/2010 |
| WO | 2006/126680 | 11/2006 |

* cited by examiner

COPOLYMER AND AQUEOUS COATING COMPOSITION USING SAME

TECHNICAL FIELD

The present invention relates to a copolymer that can be used as an aqueous coating material additive which has good water resistance and allows weather resistance to be increased, and to an aqueous coating composition that contains the copolymer.

BACKGROUND ART

Coating materials are used in a wide variety of applications, for instance in buildings, vehicles including automobiles and railcars, as well as ships, structures, electrical machinery, metallic articles, gardening supplies, furniture, leather, models and the like. In recent years, under the influence of environmental issues and the like, there has been a growing trend of oil-based coating materials being substituted by aqueous coating materials. The performance required from coating material varies depending on the concrete application, but weather resistance performance is often regarded as a major performance metric demanded from coating films of coating materials, in a field of a large market size such as buildings, vehicles including automobiles and railcars, as well as ships, structures and the like; thus, numerous companies and researchers have come to address improvements in weather resistance in aqueous coating materials.

Concrete approaches include: (i) addition of a silicon compound or a fluorine compound, being high-weather resistance substances, to a resin: for instance, Patent Document 1 discloses an aqueous coating composition that has excellent weather resistance and is obtained through addition of a water-soluble fluororesin to an aqueous dispersion of a synthetic resin; (ii) addition of a weather resistance improver such as an ultraviolet absorber (UVA) or hindered amine-type light stabilizer (HALS) to a resin: for instance, Patent Document 2 discloses an aqueous coating composition having excellent weather resistance and containing a coating film forming resin and a dispersed benzotriazole-based ultraviolet absorber having a particle size of 3 μm or less; Patent Document 3 discloses a high-weather resistance coating material resulting from adding 0.1 to 3 wt %, with respect to resin solids, of each of a hindered phenol-based antioxidant and a benzotriazole-based ultraviolet absorber; and (iii) addition, to a resin, of a water dispersion resulting from emulsion polymerization of a monomer having an unsaturated double bond in the molecule and a polymerization-reactive light stabilizer: for instance, Patent Document 4 discloses an aqueous coating composition having a polymerizable ultraviolet stabilizer as an essential component, the composition being formulated as an aqueous dispersion of a polymer obtained through multistage emulsion polymerization of radical-polymerizable unsaturated monomers; and Patent Document 5 discloses an aqueous coating composition resulting from adding, to an aqueous resin, a copolymer obtained through emulsion polymerization of unsaturated monomers including 0.5 to 50 parts by mass of an ethylenically unsaturated monomer having a piperidyl group in the molecule, and 50 to 99.5 parts by mass of a specific ethylenically unsaturated monomer, in the presence of 0.1 to 10 parts by mass of an emulsifier.

PRIOR ART DOCUMENTS

Patent Documents

[Patent Document 1] Japanese Patent Laid-Open No. H05-117578

[Patent Document 2] Japanese Patent Laid-Open No. 2002-201420

[Patent Document 3] Japanese Patent Publication No. H03-46506

[Patent Document 4] Japanese Patent Laid-Open No. 2004-292748

[Patent Document 5] WO 2006-126680

SUMMARY OF THE INVENTION

Problem to be Solved by the Invention

In method (i) such as that of Patent Document 1, however, the high weather resistance substance such as a silicon compound or fluorine compound may aggregate or settle when added to an aqueous dispersion of a synthetic resin; this is problematic in that, as a result, the weather resistance of the coating material cannot be increased. In method (ii), such as that of Patent Documents 2 and 3, the weather resistance improver such as an ultraviolet absorber (UVA) or hindered amine-type light stabilizer (HALS) has low molecular weight, and accordingly the weather resistance improver volatilizes and/or bleeds out readily; thus a coating material exhibiting good weather resistance over a prolonged period of time may in some instances fail to be achieved. Further, water resistance is often poor due to the use of a large amount of dispersant in the dispersion. In method (iii) such as that of Patent Documents 4 and 5, a weather resistance improver is built into the resin, and accordingly volatilization and bleed-out are less likely to occur. However, good weather resistance may fail to be obtained in some instances since the effective component is embedded in the resin. Although the amount of dispersant used is smaller than that in method (ii) above, water resistance may nevertheless be impaired due to influence of the emulsifier that is used for emulsion polymerization. Accordingly, aqueous coating compositions or aqueous coating material additives which combine good weather resistance and good water resistance are in demand in the market.

Therefore, the goal to be achieved by the present invention is to provide a copolymer that can be used as an aqueous coating material additive for imparting good weather resistance and good water resistance, and to provide an aqueous coating composition that contains the copolymer.

Means for Solving the Problem

As a result of diligent research, the inventors found a copolymer that can be used as an aqueous coating material additive that imparts good weather resistance and good water resistance, and perfected the present invention on the basis of that finding.

Specifically, the present invention is a copolymer containing, as essential structural units, unit A represented by Formula (1) and unit B represented by Formula (2):

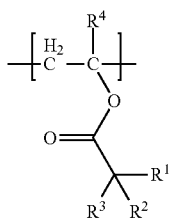

(1)

(wherein $R^1$ and $R^4$ each independently represent a hydrogen atom or a methyl group, and $R^2$ and $R^3$ each independently represent a hydrogen atom or a C1-20 hydrocarbon group, excluding cases where two or more groups of $R^1$ to $R^3$ are hydrogen atoms.)

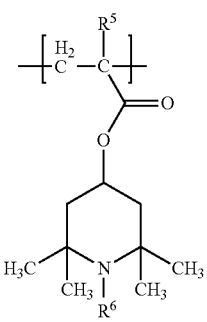

(2)

(wherein $R^5$ represents a hydrogen atom or a methyl group, and $R^6$ represents a group selected from the group consisting of C1-20 hydrocarbon groups optionally containing an oxygen atom, C1-20 alkoxy groups, hydrogen atoms, oxygen radicals and hydroxyl groups.)

Effects of the Invention

The present invention provides a copolymer that can be used as an aqueous coating material additive capable of imparting good weather resistance and good water resistance, and provides an aqueous coating composition that contains the copolymer.

BEST MODE FOR CARRYING OUT THE INVENTION

The copolymer of the present invention is a copolymer that can be used as an aqueous coating material additive capable of imparting good weather resistance and good water resistance, being specifically a copolymer containing, as essential structural units, unit A represented by Formula (1) and unit B represented by Formula (2):

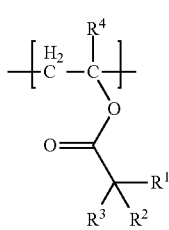

(1)

(wherein $R^1$ and $R^4$ each independently represent a hydrogen atom or a methyl group, and $R^2$ and $R^3$ each independently represent a hydrogen atom or a C1-20 hydrocarbon group, excluding cases where two or more groups of $R^1$ to $R^3$ are hydrogen atoms.)

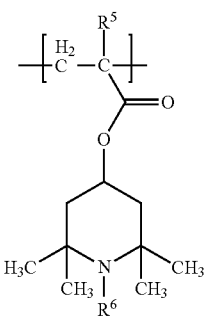

(2)

(wherein $R^5$ represents a hydrogen atom or a methyl group, and $R^6$ represents a group selected from the group consisting of C1-20 hydrocarbon groups optionally containing an oxygen atom, C1-20 alkoxy groups, hydrogen atoms, oxygen radicals and hydroxyl groups.)

Herein $R^1$ and $R^4$ in Formula (1) each independently represent a hydrogen atom or a methyl group, but $R^4$ is preferably a hydrogen atom, since starting materials can be readily procured in such a case. Further, $R^2$ and $R^3$ in Formula (1) each independently represent a hydrogen atom or a C1-20 hydrocarbon group. Examples of C1-20 hydrocarbon groups include for instance saturated aliphatic hydrocarbon groups such as methyl, ethyl, n-propyl, isopropyl, n-butyl, isobutyl, s-butyl, t-butyl, n-pentyl, branched pentyl, secondary pentyl, tertiary pentyl, n-hexyl, branched hexyl, secondary hexyl, tertiary hexyl, n-heptyl, branched heptyl, secondary heptyl, tertiary heptyl, n-octyl, 2-ethylhexyl, branched octyl, secondary octyl, tertiary octyl, n-nonyl, branched nonyl, secondary nonyl, tertiary nonyl, n-decyl, branched decyl, secondary decyl, tertiary decyl, n-undecyl, branched undecyl, secondary undecyl, tertiary undecyl, n-dodecyl, branched dodecyl, secondary dodecyl, tertiary dodecyl, n-tridecyl, branched tridecyl, secondary tridecyl, tertiary tridecyl, n-tetradecyl, branched tetradecyl, secondary tetradecyl, tertiary tetradecyl, n-pentadecyl, branched pentadecyl, secondary pentadecyl, tertiary pentadecyl, n-hexadecyl, branched hexadecyl, secondary hexadecyl, tertiary hexadecyl, n-heptadecyl, branched heptadecyl, secondary heptadecyl, tertiary heptadecyl, n-octadecyl, branched octadecyl, secondary octadecyl, tertiary octadecyl, n-nonadecyl, branched nonadecyl, secondary nonadecyl, tertiary nonadecyl, n-icosyl, branched icosyl, secondary icosyl, tertiary icosyl groups and the like; unsaturated aliphatic hydrocarbon groups such as vinyl, 1-propenyl, allyl, 1-butenyl, 2-butenyl, 3-butenyl, 1-methyl-2-propenyl, 2-methyl-2-propenyl, 1-pentenyl, 2-pentenyl, 3-pentenyl, 4-pentenyl, 1-methyl-2-butenyl, 2-methyl-2-butenyl, 1-hexenyl, 2-hexenyl, 3-hexenyl, 4-hexenyl, 5-hexenyl, 1-heptenyl, 6-heptenyl, 1-octenyl, 7-octenyl, 8-nonenyl, 1-decenyl, 9-decenyl, 10-undecenyl, 1-dodecenyl, 4-dodecenyl, 11-dodecenyl, 12-tridecenyl, 13-tetradecenyl, 14-pentadecenyl, 15-hexadecenyl, 16-heptadecenyl, 1-octadecenyl, 2-ethyl-1-octadecenyl, 17-octadecenyl, 18-nonadecenyl, 19-icosenyl groups and the like; aromatic hydrocarbon groups such as phenyl, toluyl, xylyl, cumenyl, mesityl, benzyl, phenethyl, styryl, cinnamyl, benzhydryl, trityl, ethyl phenyl, propyl phenyl, butyl phenyl, pentyl phenyl, hexyl phenyl, heptyl phenyl, octyl phenyl, nonyl phenyl, decyl phenyl, undecyl phenyl, dodecyl phenyl, styrenated phenyl, p-cumyl phenyl, phenyl phenyl, benzyl phenyl, α-naphthyl, β-naphthyl groups and the like; and alicyclic hydrocarbon groups such as cyclopropyl, cyclobutyl, cyclopentyl, cyclohexyl, cycloheptyl, cyclooctyl, methylcyclopentyl, methylcyclohexyl, methylcycloheptyl, methylcyclooctyl, 4,4,6,6-tetramethylcyclohexyl, 1,3-dibutylcyclohexyl, norbornyl, bicyclo[2.2.2]octyl, adamantyl, 1-cyclobutenyl, 1-cyclopentenyl, 3-cyclopentenyl, 1-cyclohexenyl, 3-cyclohexenyl, 3-cycloheptenyl, 4-cyclooctenyl, 2-methyl-3-cyclohexenyl, 3,4-dimethyl-3-cyclohexenyl groups and the like.

Preferred among the foregoing are groups derived from compounds represented by Formula (4), exemplified as below-described essential starting monomers of the copolymer of the present invention, i.e. groups corresponding to the above compounds, since starting materials can be readily procured in that case.

Preferably, $R^2$ and $R^3$ in Formula (1) are each independently a hydrogen atom or a C1-10 hydrocarbon group, and more preferably, $R^2$ and $R^3$ are a hydrogen atom or a C1-10 saturated aliphatic hydrocarbon group, since a good weather resistance improvement effect can be achieved in such cases. Preferably, the total number of carbon atoms of the groups $R^1$ to $R^3$ is 1 to 20, more preferably, the total number of carbon atoms of the groups $R^1$ to $R^3$ is 4 to 15, and yet more preferably, the total number of carbon atoms of the groups $R^1$ to $R^3$ is 6 to 9, since a better weather resistance improvement effect is achieved in such cases. Herein there are excluded instances where two or more groups of $R^1$ to $R^3$ are hydrogen atoms (for example, $R^2$ and $R^3$ being both a C1-20 hydrocarbon group in a case where $R^1$ is a hydrogen atom, or in an instance where either one of $R^2$ and $R^3$ is a hydrogen atom, then the other is a C1-20 hydrocarbon group and $R^1$ is a methyl group).

Although $R^5$ in Formula (2) represents a hydrogen atom or a methyl group, $R^5$ is preferably a methyl group, since in that case the effect of the present invention is readily achieved. Herein $R^6$ in Formula (2) represents a group selected from the group consisting of C1-20 hydrocarbon groups optionally containing an oxygen atom, C1-20 alkoxy groups, hydrogen atoms, oxygen radicals and hydroxyl groups. Examples of C1-20 hydrocarbon groups not containing oxygen atoms include for instance saturated aliphatic hydrocarbon groups such as methyl, ethyl, n-propyl, isopropyl, n-butyl, isobutyl, s-butyl, t-butyl, n-pentyl, branched pentyl, secondary pentyl, tertiary pentyl, n-hexyl, branched hexyl, secondary hexyl, tertiary hexyl, n-heptyl, branched heptyl, secondary heptyl, tertiary heptyl, n-octyl, 2-ethylhexyl, branched octyl, secondary octyl, tertiary octyl, n-nonyl, branched nonyl, secondary nonyl, tertiary nonyl, n-decyl, branched decyl, secondary decyl, tertiary decyl, n-undecyl, branched undecyl, secondary undecyl, tertiary undecyl, n-dodecyl, branched dodecyl, secondary dodecyl, tertiary dodecyl, n-tridecyl, branched tridecyl, secondary tridecyl, tertiary tridecyl, n-tetradecyl, branched tetradecyl, secondary tetradecyl, tertiary tetradecyl, n-pentadecyl, branched pentadecyl, secondary pentadecyl, tertiary pentadecyl, n-hexadecyl, branched hexadecyl, secondary hexadecyl, tertiary hexadecyl, n-heptadecyl, branched heptadecyl, secondary heptadecyl, tertiary heptadecyl, n-octadecyl, branched octadecyl, secondary octadecyl, tertiary octadecyl, n-nonadecyl, branched nonadecyl, secondary nonadecyl, tertiary nonadecyl, n-icosyl, branched icosyl, secondary icosyl, tertiary icosyl groups and the like; unsaturated aliphatic hydrocarbon groups such as vinyl, 1-propenyl, allyl, 1-butenyl, 2-butenyl, 3-butenyl, 1-methyl-2-propenyl, 2-methyl-2-propenyl, 1-pentenyl, 2-pentenyl, 3-pentenyl, 4-pentenyl, 1-methyl-2-butenyl, 2-methyl-2-butenyl, 1-hexenyl, 2-hexenyl, 3-hexenyl, 4-hexenyl, 5-hexenyl, 1-heptenyl, 6-heptenyl, 1-octenyl, 7-octenyl, 8-nonenyl, 1-decenyl, 9-decenyl, 10-undecenyl, 1-dodecenyl, 4-dodecenyl, 11-dodecenyl, 12-tridecenyl, 13-tetradecenyl, 14-pentadecenyl, 15-hexadecenyl, 16-heptadecenyl, 1-octadecenyl, 2-ethyl-1-octadecenyl, 17-octadecenyl, 18-nonadecenyl, 19-icosenyl groups and the like; aromatic hydrocarbon groups such as phenyl, toluyl, xylyl, cumenyl, mesityl, benzyl, phenethyl, styryl, cinnamyl, benzhydryl, trityl, ethyl phenyl, propyl phenyl, butyl phenyl, pentyl phenyl, hexyl phenyl, heptyl phenyl, octyl phenyl, nonyl phenyl, decyl phenyl, undecyl phenyl, dodecyl phenyl, styrenated phenyl, p-cumyl phenyl, phenyl phenyl, benzyl phenyl, α-naphthyl, β-naphthyl groups and the like; and alicyclic hydrocarbon groups such as cyclopropyl, cyclobutyl, cyclopentyl, cyclohexyl, cycloheptyl, cyclooctyl, methylcyclopentyl, methylcyclohexyl, methylcycloheptyl, methylcyclooctyl, 4,4,6,6-tetramethylcyclohexyl, 1,3-dibutylcyclohexyl, norbornyl, bicyclo[2.2.2]octyl, adamantyl, 1-cyclobutenyl, 1-cyclopentenyl, 3-cyclopentenyl, 1-cyclohexenyl, 3-cyclohexenyl, 3-cycloheptenyl, 4-cyclooctenyl, 2-methyl-3-cyclohexenyl, 3,4-dimethyl-3-cyclohexenyl groups and the like.

Herein C1-20 hydrocarbon groups containing an oxygen atom denote groups resulting from replacing a carbon atom in the hydrocarbon group by an oxygen atom, to introduce thereby an oxygen atom at one, two or more sites of the hydrocarbon group, and denote specifically for instance ether groups.

Further, C1-20 alkoxy groups denote groups represented by —OR', where R' represents a C1-20 hydrocarbon group. Examples of R' include instances identical to those of the C1-20 hydrocarbon group not containing an oxygen atom listed above.

Preferred among the foregoing are groups derived from compounds represented by Formula (5), exemplified as below-described essential starting monomers of the copolymer of the present invention, i.e. groups corresponding to the above compounds, since starting materials can be readily procured in that case. Preferred herein are a hydrogen atom, a C1-20 hydrocarbon group optionally containing an oxygen atom or a C1-20 alkoxy group, more preferably a hydrogen atom, a C1-10 hydrocarbon group optionally containing an oxygen atom or a C1-10 alkoxy group, yet more preferably a hydrogen atom or a C1-10 hydrocarbon group optionally containing an oxygen atom, even yet more preferably a hydrogen atom or a C1-4 hydrocarbon group optionally containing an oxygen atom, and most preferably a hydrogen atom or a methyl group, since in such cases a good weather resistance improvement effect is achieved.

The copolymer of the present invention may contain two or more types of unit A having different $R^1$ to $R^4$ in Formula (1), or may contain two or more types of unit B having different $R^5$ and $R^6$ in Formula (2), so long as the unit A represented by Formula (1) and the unit B represented by Formula (2) are essential structural units, but preferably the copolymer of the present invention contains one type of unit A and one type of unit B, since in that case the effect of the present invention is readily achieved.

Preferably, the copolymer of the present invention having unit A and unit B as essential structural units contains 50 mass % or more, more preferably 80 mass % or more, and yet more preferably 90 mass % or more, of unit A and unit B, since in such cases the effect of the present invention is readily achieved. Preferably, the copolymer of the present invention consists essentially of unit A and unit B, and most preferably consists only of unit A and unit B. The language "essentially" denotes herein that the copolymer is mainly made up of unit A and unit B, with the total content of units other than unit A and unit B being no greater than 1 mass %. The polymerization form of the copolymer is not particularly defined, and may be block copolymerization, random copolymerization, alternating copolymerization or graft copolymerization of a starting monomer that forms the unit A and a starting monomer that forms the unit B.

The constitutional ratio of unit A and unit B in the copolymer of the present invention is not particularly limited so long as the effect of the present invention can be achieved, but is preferably unit A/unit B=50/50 to 90/10 (mass ratio), more preferably 50/50 to 65/35 (mass ratio), since a copolymer is obtained then that imparts better weather resistance and better water resistance. When the proportion of unit A is higher than unit A/unit B=90/10 (mass ratio), good weather resistance may fail to be achieved is some cases, while when the proportion of unit B is higher than unit A/unit B=50/50 (mass ratio), cost performance may be impaired since the starting monomer that forms the unit B is expensive; moreover, the weather resistance improvement effect reaches in that case a plateau, and an effect of the present invention commensurate with the constitutional ratio of the unit B in the copolymer may fail to be achieved.

The copolymer of the present invention can further contain, as structural units other than the unit A and unit B, also unit C represented by Formula (3) (excluding unit B represented by Formula (2)), so long as the effect of the present invention is not impaired thereby.

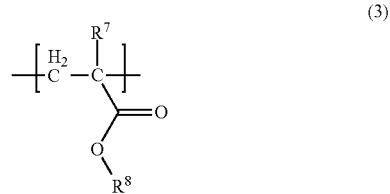

(3)

(wherein $R^7$ represents a hydrogen atom or a methyl group, and $R^8$ represents a C1-20 hydrocarbon group optionally having one, two or more substituents selected from the group consisting of hydroxyl groups, alkoxy groups, glycidyl groups, nitro groups, ether groups, carbonyl groups, carboxyl groups, ester groups, cyano groups, amide groups, amino groups and halogen atoms.)

Herein $R^7$ in Formula (3) represents a hydrogen atom or a methyl group, but is preferably a methyl group, since in that case there is obtained a copolymer having a good weather resistance improvement effect, without impairing the effect of the present invention. Further, $R^8$ in Formula (3) represents a C1-20 hydrocarbon group optionally having one, two or more substituents selected from the group consisting of hydroxyl groups, alkoxy groups, glycidyl groups, nitro groups, ether groups, carbonyl groups, carboxyl groups, ester groups, cyano groups, amide groups, amino groups and halogen atoms. In a case where the C1-20 hydrocarbon group has no substituents, examples include for instance saturated aliphatic hydrocarbon groups such as methyl, ethyl, n-propyl, isopropyl, n-butyl, isobutyl, s-butyl, t-butyl, n-pentyl, branched pentyl, secondary pentyl, tertiary pentyl, n-hexyl, branched hexyl, secondary hexyl, tertiary hexyl, n-heptyl, branched heptyl, secondary heptyl, tertiary heptyl, n-octyl, 2-ethylhexyl, branched octyl, secondary octyl, tertiary octyl, n-nonyl, branched nonyl, secondary nonyl, tertiary nonyl, n-decyl, branched decyl, secondary decyl, tertiary decyl, n-undecyl, branched undecyl, secondary undecyl, tertiary undecyl, n-dodecyl, branched dodecyl, secondary dodecyl, tertiary dodecyl, n-tridecyl, branched tridecyl, secondary tridecyl, tertiary tridecyl, n-tetradecyl, branched tetradecyl, secondary tetradecyl, tertiary tetradecyl, n-pentadecyl, branched pentadecyl, secondary pentadecyl, tertiary pentadecyl, n-hexadecyl, branched hexadecyl, secondary hexadecyl, tertiary hexadecyl, n-heptadecyl, branched heptadecyl, secondary heptadecyl, tertiary heptadecyl, n-octadecyl, branched octadecyl, secondary octadecyl, tertiary octadecyl, n-nonadecyl, branched nonadecyl, secondary nonadecyl, tertiary nonadecyl, n-icosyl, branched icosyl, secondary icosyl, tertiary icosyl groups and the like; unsaturated aliphatic hydrocarbon groups such as vinyl, 1-propenyl, allyl, 1-butenyl, 2-butenyl, 3-butenyl, 1-methyl-2-propenyl, 2-methyl-2-propenyl, 1-pentenyl, 2-pentenyl, 3-pentenyl, 4-pentenyl, 1-methyl-2-butenyl, 2-methyl-2-butenyl, 1-hexenyl, 2-hexenyl, 3-hexenyl, 4-hexenyl, 5-hexenyl, 1-heptenyl, 6-heptenyl, 1-octenyl, 7-octenyl, 8-nonenyl, 1-decenyl, 9-decenyl, 10-undecenyl, 1-dodecenyl, 4-dodecenyl, 11-dodecenyl, 12-tridecenyl, 13-tetradecenyl, 14-pentadecenyl, 15-hexadecenyl, 16-heptadecenyl, 1-octadecenyl, 2-ethyl-1-octadecenyl, 17-octadecenyl, 18-nonadecenyl, 19-icosenyl groups and the like; aromatic hydrocarbon groups such as phenyl, toluyl, xylyl, cumenyl, mesityl, benzyl, phenethyl, styryl, cinnamyl, benzhydryl, trityl, ethyl phenyl, propyl phenyl, butyl phenyl, pentyl phenyl, hexyl phenyl heptyl phenyl, octyl phenyl, nonyl phenyl, decyl phenyl, undecyl phenyl, dodecyl phenyl, styrenated phenyl, p-cumyl phenyl, phenyl phenyl, benzyl phenyl, α-naphthyl, β-naphthyl groups and the like; and alicyclic hydrocarbon groups such as cyclopropyl, cyclobutyl, cyclopentyl, cyclohexyl, cycloheptyl, cyclooctyl, methylcyclopentyl, methylcyclohexyl, methylcycloheptyl, methylcyclooctyl, 4,4,6,6-tetramethylcyclohexyl, 1,3-dibutylcyclohexyl, norbornyl, bicyclo[2.2.2]octyl, adamantyl, 1-cyclobutenyl, 1-cyclopentenyl, 3-cyclopentenyl, 1-cyclohexenyl, 3-cyclohexenyl, 3-cycloheptenyl, 4-cyclooctenyl, 2-methyl-3-cyclohexenyl, 3,4-dimethyl-3-cyclohexenyl groups and the like. In a case where the C1-20 hydrocarbon group has substituents, hydrogen atoms at one, two or more sites of the hydrocarbon group may be substituted with a substituent selected from among hydroxyl groups, alkoxy groups, glycidyl groups, nitro groups, ether groups, carbonyl groups, carboxyl groups, ester groups, cyano groups, amide groups, amino groups and halogen atoms. Further, carbon atoms in the hydrocarbon group may be replaced with introduction at one, two or more sites in the hydrocarbon group, so long as the total number of carbon atoms within the group is 1 to 20, regardless of the form.

Preferred among the foregoing are groups derived from compounds represented by Formula (6), exemplified as starting monomers of the copolymer of the present invention described below, i.e. groups corresponding to the above compounds, since starting materials can be readily procured in that case. Preferred herein are a C1-20 hydrocarbon group having no substituents and a C1-20 hydrocarbon group having a substituent selected from among hydroxyl groups, carboxyl groups, alkoxy groups and glycidyl groups, more preferably a C1-20 hydrocarbon group having no substituents and a C1-20 hydrocarbon group having a hydroxyl group, yet more preferably a C1-20 hydrocarbon group having no substituents, and even yet more preferably a C4 to 12 hydrocarbon group having no substituents, since in such cases a copolymer is obtained that exhibits good weather resistance, without impairing the effect of the present invention.

As described above, the copolymer of the present invention can contain unit C represented by Formula (3), apart from the unit A represented by Formula (1) and the unit B represented by Formula (2). The copolymer of the present invention can also contain two or more types of unit C having dissimilar $R^7$ and $R^8$ in Formula (3). In a case where the copolymer of the present invention contains unit C, however, the copolymer contains preferably one type of unit C, since in that case the effect of the present invention can be achieved readily.

In a case where the copolymer of the present invention contains unit C, the content of the latter in the copolymer can be for instance less than 50 mass %, or can be less than 20 mass %, and further less than 10 mass %, and also less than 1 mass %. The polymerization form of the copolymer containing the unit C is not particularly defined, and may be block copolymerization, random copolymerization, alternating copolymerization or graft copolymerization of a starting monomer that forms the unit A, a starting monomer that forms the unit B and a starting monomer that forms the unit C.

In a case where the copolymer of the present invention contains unit C, the constitutional ratio of the unit C with respect to the unit A and the unit B in the copolymer is not particularly limited, so long as the effect of the present invention is elicited, but is preferably (unit A+unit B)/unit C=50/50 to 99/1 (mass ratio), more preferably 60/40 to 99/1 (mass ratio), and yet more preferably 90/10 to 99/1 (mass ratio), since in a copolymer is then obtained that imparts better weather resistance and better water resistance. A good weather resistance improvement effect may fail to be obtained when the proportion of unit C is higher than (unit A+unit B)/unit C=50/50 (mass ratio). In a preferred copolymer the content of the unit C obeys that constitutional ratio while maintaining the above constitutional ratio of the unit A and unit B.

The starting monomers of the copolymer of the present invention are not particularly limited, but preferably a compound represented by Formula (4) and a compound represented by Formula (5), are used as essential starting monomers, since both procurement and production are easy in that case.

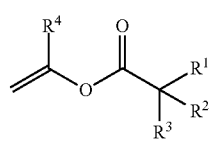
(4)

(wherein $R^1$ and $R^4$ each independently represent a hydrogen atom or a methyl group, and $R^2$ and $R^3$ each independently represent a hydrogen atom or a C1-20 hydrocarbon group, excluding cases where two or more groups of $R^1$ to $R^3$ are hydrogen atoms.)

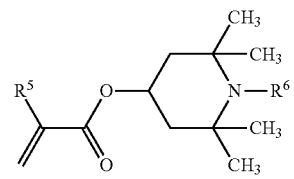
(5)

(wherein $R^5$ represents a hydrogen atom or a methyl group, and $R^6$ represents a group selected from the group consisting of C1-20 hydrocarbon groups optionally containing an oxygen atom, C1-20 alkoxy groups, hydrogen atoms, oxygen radicals and hydroxyl groups.)

Herein $R^1$ and $R^4$ in Formula (4) represent each independently a hydrogen atom or a methyl group, but preferably $R^4$ is a hydrogen atom, since starting materials can be readily procured in such a case. Further, $R^2$ and $R^3$ in Formula (4) represent each independently a hydrogen atom or a C1-20 hydrocarbon group. Examples of C1-20 hydrocarbon groups include for instance saturated aliphatic hydrocarbon groups such as methyl, ethyl, n-propyl, isopropyl, n-butyl, isobutyl, s-butyl, t-butyl, n-pentyl, branched pentyl, secondary pentyl, tertiary pentyl, n-hexyl, branched hexyl, secondary hexyl, tertiary hexyl, n-heptyl, branched heptyl, secondary heptyl, tertiary heptyl, n-octyl, 2-ethylhexyl, branched octyl, secondary octyl, tertiary octyl, n-nonyl, branched nonyl, secondary nonyl, tertiary nonyl, n-decyl, branched decyl, secondary decyl, tertiary decyl, n-undecyl, branched undecyl, secondary undecyl, tertiary undecyl, n-dodecyl, branched dodecyl, secondary dodecyl, tertiary dodecyl, n-tridecyl, branched tridecyl, secondary tridecyl, tertiary tridecyl, n-tetradecyl, branched tetradecyl, secondary tetradecyl, tertiary tetradecyl, n-pentadecyl, branched pentadecyl, secondary pentadecyl, tertiary pentadecyl, n-hexadecyl, branched hexadecyl, secondary hexadecyl, tertiary hexadecyl, n-heptadecyl, branched heptadecyl, secondary heptadecyl, tertiary heptadecyl, n-octadecyl, branched octadecyl, secondary octadecyl, tertiary octadecyl, n-nonadecyl, branched nonadecyl, secondary nonadecyl, tertiary nonadecyl, n-icosyl, branched icosyl, secondary icosyl, tertiary icosyl groups and the like; unsaturated aliphatic hydrocarbon groups such as vinyl, 1-propenyl, allyl, 1-butenyl, 2-butenyl, 3-butenyl, 1-methyl-2-propenyl, 2-methyl-2-propenyl, 1-pentenyl, 2-pentenyl, 3-pentenyl, 4-pentenyl, 1-methyl-2-butenyl, 2-methyl-2-butenyl, 1-hexenyl, 2-hexenyl, 3-hexenyl, 4-hexenyl, 5-hexenyl, 1-heptenyl, 6-heptenyl, 1-octenyl, 7-octenyl, 8-nonenyl, 1-decenyl, 9-decenyl, 10-undecenyl, 1-dodecenyl, 4-dodecenyl, 11-dodecenyl, 12-tridecenyl, 13-tetradecenyl, 14-pentadecenyl, 15-hexadecenyl, 16-heptadecenyl, 1-octadecenyl, 2-ethyl-1-octadecenyl, 17-octadecenyl, 18-nonadecenyl, 19-icosenyl groups and the like; aromatic hydrocarbon groups such as phenyl, toluyl, xylyl, cumenyl, mesityl, benzyl, phenethyl, styryl, cinnamyl, benzhydryl, trityl, ethyl phenyl, propyl phenyl, butyl phenyl, pentyl phenyl, hexyl phenyl, heptyl phenyl, octyl phenyl, nonyl phenyl, decyl phenyl, undecyl phenyl, dodecyl phenyl, styrenated phenyl, p-cumyl phenyl, phenyl phenyl, benzyl phenyl, α-naphthyl, β-naphthyl groups and the like; and alicyclic hydrocarbon groups such as cyclopropyl, cyclobutyl, cyclopentyl, cyclohexyl, cycloheptyl, cyclooctyl, methylcyclopentyl, methylcyclohexyl, methylcycloheptyl, methylcyclooctyl, 4,4,6,6-tetramethylcyclohexyl, 1,3-dibutylcyclohexyl, norbornyl, bicyclo[2.2.2]octyl, adamantyl, 1-cyclobutenyl, 1-cyclopentenyl, 3-cyclopentenyl, 1-cyclohexenyl, 3-cyclohexenyl, 3-cycloheptenyl, 4-cyclooctenyl, 2-methyl-3-cyclohexenyl, 3,4-dimethyl-3-cyclohexenyl groups and the like.

Preferably, $R^2$ and $R^3$ in Formula (4) are each independently a hydrogen atom or a C1-10 hydrocarbon group, and more preferably are a hydrogen atom or a C1-10 saturated aliphatic hydrocarbon group, since a good weather resistance improvement effect can be achieved in such cases, Preferably, the total number of carbon atoms of the groups $R^1$ to $R^3$ is 1 to 20, more preferably, the total number of carbon atoms of the groups $R^1$ to $R^3$ is 4 to 15, and yet more preferably, the total number of carbon atoms of the groups $R^1$ to $R^3$ is 6 to 9, since a better weather resistance improvement effect is achieved in such cases. Herein there are excluded instances where two or more groups of $R^1$ to $R^3$ are hydrogen atoms (for example, $R^2$ and $R^3$ being both a C1-20 hydrocarbon group in a case where $R^1$ is a hydrogen atom, or in an instance where either one of $R^2$ and $R^3$ is a hydrogen atom, then the other is a C1-20 hydrocarbon group and $R^1$ is a methyl group). A single type of the compound represented by Formula (4), or two or more types, may be used as the starting monomer, but preferably there is used one type as the starting monomer, since in that case the effect of the present invention is readily achieved.

Next, $R^5$ in Formula (5) represents a hydrogen atom or a methyl group, but is preferably a methyl group since in that case the effect of the present invention is obtained readily. Herein $R^6$ in Formula (5) represents a group selected from the group of C1-20 hydrocarbon groups optionally containing an oxygen atom, C1-20 alkoxy groups, hydrogen atoms, oxygen radicals and hydroxyl groups. Examples of C1-20 hydrocarbon groups not containing oxygen atoms include for instance saturated aliphatic hydrocarbon groups such as methyl, ethyl, n-propyl, isopropyl, n-butyl, isobutyl, s-butyl, t-butyl, n-pentyl, branched pentyl, secondary pentyl, tertiary pentyl, n-hexyl, branched hexyl, secondary hexyl, tertiary hexyl, n-heptyl, branched heptyl, secondary heptyl, tertiary heptyl, n-octyl, 2-ethylhexyl, branched octyl, secondary octyl, tertiary octyl, n-nonyl, branched nonyl, secondary nonyl, tertiary nonyl, n-decyl, branched decyl, secondary decyl, tertiary decyl, n-undecyl, branched undecyl, secondary undecyl, tertiary undecyl, n-dodecyl, branched dodecyl, secondary dodecyl, tertiary dodecyl, n-tridecyl, branched tridecyl, secondary tridecyl, tertiary tridecyl, n-tetradecyl, branched tetradecyl, secondary tetradecyl, tertiary tetradecyl, n-pentadecyl, branched pentadecyl, secondary pentadecyl, tertiary pentadecyl, n-hexadecyl, branched hexadecyl, secondary hexadecyl, tertiary hexadecyl, n-heptadecyl, branched heptadecyl, secondary heptadecyl, tertiary heptadecyl, n-octadecyl, branched octadecyl, secondary octadecyl, tertiary octadecyl, n-nonadecyl, branched nonadecyl, secondary nonadecyl, tertiary nonadecyl, n-icosyl, branched icosyl, secondary icosyl, tertiary icosyl groups and the like; unsaturated aliphatic hydrocarbon groups such as vinyl, 1-propenyl, allyl, 1-butenyl, 2-butenyl, 3-butenyl, 1-methyl-2-propenyl, 2-methyl-2-propenyl, 1-pentenyl, 2-pentenyl, 3-pentenyl, 4-pentenyl, 1-methyl-2-butenyl, 2-methyl-2-butenyl, 1-hexenyl, 2-hexenyl, 3-hexenyl, 4-hexenyl, 5-hexenyl, 1-heptenyl, 6-heptenyl, 1-octenyl, 7-octenyl, 8-nonenyl, 1-decenyl, 9-decenyl, 10-undecenyl, 1-dodecenyl, 4-dodecenyl, 11-dodecenyl, 12-tridecenyl, 13-tetradecenyl, 14-pentadecenyl, 15-hexadecenyl, 16-heptadecenyl, 1-octadecenyl, 2-ethyl-1-octadecenyl, 17-octadecenyl, 18-nonadecenyl, 19-icosenyl groups and the like; aromatic hydrocarbon groups such as phenyl, toluyl, xylyl, cumenyl, mesityl, benzyl, phenethyl, styryl, cinnamyl, benzhydryl, trityl, ethyl phenyl, propyl phenyl, butyl phenyl, pentyl phenyl, hexyl phenyl, heptyl phenyl, octyl phenyl, nonyl phenyl, decyl phenyl, undecyl phenyl, dodecyl phenyl, styrenated phenyl, p-cumyl phenyl, phenyl phenyl, benzyl phenyl, α-naphthyl, β-naphthyl groups and the like; and alicyclic hydrocarbon groups such as cyclopropyl, cyclobutyl, cyclopentyl, cyclohexyl, cycloheptyl, cyclooctyl, methylcyclopentyl, methylcyclohexyl, methylcycloheptyl, methylcyclooctyl, 4,4,6,6-tetramethylcyclohexyl, 1,3-dibutylcyclohexyl, norbornyl, bicyclo[2.2.2]octyl, adamantyl, 1-cyclobutenyl, 1-cyclopentenyl, 3-cyclopentenyl, 1-cyclohexenyl, 3-cyclohexenyl, 3-cycloheptenyl, 4-cyclooctenyl, 2-methyl-3-cyclohexenyl, 3,4-dimethyl-3-cyclohexenyl groups and the like.

Herein C1-20 hydrocarbon groups containing an oxygen atom denote groups resulting from replacing a carbon atom in the hydrocarbon group by an oxygen atom, to introduce thereby an oxygen atom at one, two or more sites of the hydrocarbon group, and denote specifically for instance ether groups. Further, C1-20 alkoxy groups denote groups represented by —OR', where R' represents a C1-20 hydrocarbon group. Examples of R' include instances identical to those of the C1-20 hydrocarbon group not containing an oxygen atom listed above.

Preferred among the foregoing are a hydrogen atom, a C1-20 hydrocarbon group optionally containing an oxygen atom, or a C1-20 alkoxy group, more preferably a hydrogen atom, a C1-10 hydrocarbon group optionally containing an oxygen atom, or a C1-10 alkoxy group, yet more preferably a hydrogen atom or a C1-10 hydrocarbon group optionally containing an oxygen atom, even yet more preferably a hydrogen atom or a C1-4 hydrocarbon group optionally containing an oxygen atom, and most preferably a hydrogen atom or a methyl group, since in such cases a good weather resistance improvement effect is achieved. A single type of the compound represented by Formula (5), or two or more types, may be used as the starting monomer, but preferably there is used one type as the starting monomer, since in that case the effect of the present invention can be achieved readily.

The compound represented by Formula (4) and the compound represented by Formula (5) being essential starting monomers of the copolymer of the present invention may be used in any proportion, but preferably the monomers are caused to react at a proportion [compound represented by Formula (4)]/[compound represented by Formula (5)]=50/50 to 90/10 (mass ratio), more preferably at a proportion 50/50 to 65/35 (mass ratio), since in such cases a copolymer is obtained that imparts good weather resistance and good water resistance. Good weather resistance may fail to be obtained when the proportion of the compound represented by Formula (4) is higher than [compound represented by Formula (4)]/[compound represented by Formula (5)]=90/10 (mass ratio), while cost performance may drop when the proportion of the compound represented by Formula (5) is higher than [compound represented by Formula (4)]/[compound represented by Formula (5)]=50/50 (mass ratio), on account of the high price of the compound represented by Formula (5); moreover, the weather resistance improvement effect reaches in that case a plateau, and an effect of the present invention commensurate with the use amount of the compound represented by Formula (5) may fail to be achieved.

The copolymer of the present invention can be obtained by causing the compound represented by Formula (4) and the compound represented by Formula (5), as starting monomers, to react with each other. The copolymer may be produced using just the compound represented by Formula (4) and the compound represented by Formula (5) as starting monomers, but may be obtained by polymerizing not only the compound represented by Formula (4) and the compound represented by Formula (5), but also through polymerization together with a polymerizable monomer as another starting monomer. The polymerizable monomer that can be used as the other starting monomer may be any monomer so long as the latter is known as an ordinary polymerizable monomer. Examples of other starting monomers that can be used include for instance compounds represented by Formula (6) (excluding compounds represented by Formula (5)).

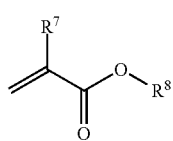

(6)

(wherein $R^7$ represents a hydrogen atom or a methyl group, and $R^8$ represents a C1-20 hydrocarbon group optionally having one, two or more substituents selected from the group consisting of hydroxyl groups, alkoxy groups, glycidyl groups, nitro groups, ether groups, carbonyl groups, carboxyl groups, ester groups, cyano groups, amide groups, amino groups and halogen atoms.)

Herein $R^7$ in Formula (6) represents a hydrogen atom or a methyl group, but is preferably a methyl group, since in that case there is obtained a copolymer having a good weather resistance improvement effect, without impairing the effect of the present invention. Further, $R^8$ in Formula (6) represents a C1-20 hydrocarbon group optionally having one, two or more substituents selected from the group consisting of hydroxyl groups, alkoxy groups, glycidyl groups, nitro groups, ether groups, carbonyl groups, carboxyl groups, ester groups, cyano groups, amide groups, amino groups and halogen atoms. In a case where the C1-20 hydrocarbon group has no substituents, examples include for instance saturated aliphatic hydrocarbon groups such as methyl, ethyl, n-propyl, isopropyl, n-butyl, isobutyl, s-butyl, t-butyl, n-pentyl, branched pentyl, secondary pentyl, tertiary pentyl, n-hexyl, branched hexyl, secondary hexyl, tertiary hexyl, n-heptyl, branched heptyl, secondary heptyl, tertiary heptyl, n-octyl, 2-ethylhexyl, branched octyl, secondary octyl, tertiary octyl, n-nonyl, branched nonyl, secondary nonyl, tertiary nonyl, n-decyl, branched decyl, secondary decyl, tertiary decyl, n-undecyl, branched undecyl, secondary undecyl, tertiary undecyl, n-dodecyl, branched dodecyl, secondary dodecyl, tertiary dodecyl, n-tridecyl, branched tridecyl, secondary tridecyl, tertiary tridecyl, n-tetradecyl, branched tetradecyl, secondary tetradecyl, tertiary tetradecyl, n-pentadecyl, branched pentadecyl, secondary pentadecyl, tertiary pentadecyl, n-hexadecyl, branched hexadecyl, secondary hexadecyl, tertiary hexadecyl, n-heptadecyl, branched heptadecyl, secondary heptadecyl, tertiary heptadecyl, n-octadecyl, branched octadecyl, secondary octadecyl, tertiary octadecyl, n-nonadecyl, branched nonadecyl, secondary nonadecyl, tertiary nonadecyl, n-icosyl, branched icosyl, secondary icosyl, tertiary icosyl groups and the like; unsaturated aliphatic hydrocarbon groups such as vinyl, 1-propenyl, allyl, 1-butenyl, 2-butenyl, 3-butenyl, 1-methyl-2-propenyl, 2-methyl-2-propenyl, 1-pentenyl, 2-pentenyl, 3-pentenyl, 4-pentenyl, 1-methyl-2-butenyl, 2-methyl-2-butenyl, 1-hexenyl, 2-hexenyl, 3-hexenyl, 4-hexenyl, 5-hexenyl, 1-heptenyl, 6-heptenyl, 1-octenyl, 7-octenyl, 8-nonenyl, 1-decenyl, 9-decenyl, 10-undecenyl, 1-dodecenyl, 4-dodecenyl, 11-dodecenyl, 12-tridecenyl, 13-tetradecenyl, 14-pentadecenyl, 15-hexadecenyl, 16-heptadecenyl, 1-octadecenyl, 2-ethyl-1-octadecenyl, 17-octadecenyl, 18-nonadecenyl, 19-icosenyl groups and the like; aromatic hydrocarbon groups such as phenyl, toluyl, xylyl, cumenyl, mesityl, benzyl, phenethyl, styryl, cinnamyl, benzhydryl, trityl, ethyl phenyl, propyl phenyl, butyl phenyl, pentyl phenyl, hexyl phenyl, heptyl phenyl, octyl phenyl, nonyl phenyl, decyl phenyl, undecyl phenyl, dodecyl phenyl, styrenated phenyl, p-cumyl phenyl, phenyl phenyl, benzyl phenyl, α-naphthyl, β-naphthyl groups and the like; and alicyclic hydrocarbon groups such as cyclopropyl, cyclobutyl, cyclopentyl, cyclohexyl, cycloheptyl, cyclooctyl, methylcyclopentyl, methylcyclohexyl, methylcycloheptyl, methylcyclooctyl, 4,4,6,6-tetramethylcyclohexyl, 1,3-dibutylcyclohexyl, norbornyl, bicyclo[2.2.2]octyl, adamantyl, 1-cyclobutenyl, 1-cyclopentenyl, 3-cyclopentenyl, 1-cyclohexenyl, 3-cyclohexenyl, 3-cycloheptenyl, 4-cyclooctenyl, 2-methyl-3-cyclohexenyl, 3,4-dimethyl-3-cyclohexenyl groups and the like. In a case where the C1-20 hydrocarbon group has substituents, hydrogen atoms at one, two or more sites of the hydrocarbon group may be substituted with a substituent selected from the group consisting of hydroxyl groups, alkoxy groups, glycidyl groups, nitro groups, ether groups, carbonyl groups, carboxyl groups, ester groups, cyano groups, amide groups, amino groups and halogen atoms. Further, carbon atoms in the hydrocarbon group may be replaced with introduction at one, two or more sites in the hydrocarbon group, so long as the total number of carbon atoms within the group is 1 to 20 regardless of the form.

Preferred herein are a C1-20 hydrocarbon group having no substituents and a C1-20 hydrocarbon group having a substituent selected from among hydroxyl groups, carboxyl groups, alkoxy groups and glycidyl groups, more preferably a C1-20 hydrocarbon group having no substituents and a C1-20 hydrocarbon group having a hydroxyl group, yet more preferably a C1-20 hydrocarbon group having no substituents, and even yet more preferably a C4 to 12 hydrocarbon group having no substituents, since in such cases a copolymer is obtained that exhibits good weather resistance, without impairing the effect of the present invention.

The compounds represented by Formula (6) are known substances and therefore can be produced in accordance with known methods; alternatively some of the compounds can be procured as commercially-available products. Examples of the compound represented by Formula (6) include for instance acrylic acid esters and methacrylic acid esters other than compound represented by Formula (5). Specific examples of acrylic acid esters include for instance acrylic acid alkyl esters such as methyl acrylate, ethyl acrylate, n-propyl acrylate, isopropyl acrylate, n-butyl acrylate, isobutyl acrylate, s-butyl acrylate, t-butyl acrylate, n-pentyl acrylate, n-hexyl acrylate, n-heptyl acrylate, n-octyl acrylate, 2-ethylhexyl acrylate, n-nonyl acrylate, isononyl acrylate, n-decyl acrylate, n-undecyl acrylate, n-dodecyl acrylate, n-tridecyl acrylate, n-tetradecyl acrylate, n-pentadecyl acrylate, n-hexadecyl acrylate, n-heptadecyl acrylate, n-octadecyl acrylate, n-nonadecyl acrylate, n-eicosyl acrylate and the like; alicyclic hydrocarbon group-containing acrylic acid esters such as cyclohexyl acrylate, 4-methylcyclohexylmethyl acrylate, t-butylcyclohexyl acrylate, cyclooctyl acrylate, cyclododecyl acrylate, cyclohexylmethyl acrylate, dicyclopentanyl acrylate, oxocyclohexylmethyl acrylate, 3,4-epoxycyclohexylmethyl acrylate, isobornyl acrylate and the like; hydroxyl group-containing acrylic acid esters such as 2-hydroxyethyl acrylate, 2-hydroxypropyl acrylate, 3-hydroxypropyl acrylate, 2-hydroxybutyl acrylate, 4-hydroxybutyl acrylate, polyethylene glycol monoacrylate, polypropylene glycol monoacrylate, polytetramethylene glycol monoacrylate, polyethylene glycol polypropylene glycol monoacrylate, polyethylene glycol polytetramethylene glycol monoacrylate, polypropylene glycol polytetramethylene glycol monoacrylate and the like; carboxyl group-containing acrylic acid esters such as 2-carboxyethyl acrylate, 2-carboxypropyl acrylate, 3-carboxypropyl acrylate, 4-carboxybutyl acrylate and the like; alkoxy group-containing acrylic acid esters such as 2-methoxyethyl acrylate, 2-ethoxyethyl acrylate, 2-butoxyethyl acrylate, 2-octoxyethyl acrylate, 2-lauroxyethyl acrylate, 3-methoxypropyl acrylate, 3-ethoxypropyl acrylate, 3-methoxybutyl acrylate, methoxy polyethylene glycol monoacrylate, ethoxy polyethylene glycol monoacrylate, butoxy polyethylene glycol monoacrylate, octoxy polyethylene glycol monoacrylate, lauroxy polyethylene glycol monoacrylate, stearoxy polyethylene glycol monoacrylate, methoxy polypropylene glycol monoacrylate, octoxy polyethylene glycol polypropylene glycol monoacrylate, phenoxy polyethylene glycol monoacrylate, phenoxy polypropylene glycol monoacrylate, nonylphenoxy polyethylene glycol monoacrylate, nonylphenoxy polyethylene glycol polypropylene glycol monoacrylate and the like; and glycidyl group-containing acrylic acid esters such as glycidyl acrylate and methyl glycidyl acrylate. Besides the foregoing, other examples of acrylic acid esters include for instance N,N'-dimethylaminoethyl acrylate, trifluoroethyl acrylate, tetrafluoropropyl acrylate, benzyl acrylate and the like. Preferred among the above are acrylic acid alkyl esters, alicyclic hydrocarbon group-containing acrylic acid esters, hydroxyl group-containing acrylic acid esters, carboxyl group-containing acrylic acid esters, alkoxy group-containing acrylic acid esters and glycidyl group-containing acrylic acid esters, more preferably acrylic acid alkyl esters, hydroxyl group-containing acrylic acid esters, alkoxy group-containing acrylic acid esters and glycidyl group-containing acrylic acid esters, yet more preferably acrylic acid alkyl esters and hydroxyl group-containing acrylic acid esters, and even yet more preferably acrylic acid alkyl esters, since the weather resistance improvement effect is high in such cases.

Where an acrylic acid ester represented by Formula (6) is used together with the compound represented by Formula (4) and the compound represented by Formula (5) as a starting monomer of the copolymer of the present invention, there may be used one type, or two or more types, of the acrylic acid esters above. Examples of methacrylic acid esters include for instance methacrylic acid alkyl esters such as methyl methacrylate, ethyl methacrylate, n-propyl methacrylate, isopropyl methacrylate, n-butyl methacrylate, isobutyl methacrylate, s-butyl methacrylate, t-butyl methacrylate, n-pentyl methacrylate, n-hexyl methacrylate, n-heptyl methacrylate, n-octyl methacrylate, 2-ethylhexyl methacrylate, n-nonyl methacrylate, isononyl methacrylate, n-decyl methacrylate, n-undecyl methacrylate, n-dodecyl methacrylate, tridecyl methacrylate, n-tetradecyl methacrylate, n-pentadecyl methacrylate, n-hexadecyl methacrylate, n-heptadecyl methacrylate, n-octadecyl methacrylate, n-nonadecyl methacrylate, n-eicosyl methacrylate and the like; alicyclic hydrocarbon group-containing methacrylic acid esters such as cyclohexyl methacrylate, 4-methylcyclohexylmethyl methacrylate, t-butylcyclohexyl methacrylate, cyclooctyl methacrylate, cyclododecyl methacrylate, cyclohexylmethyl methacrylate, dicyclopentanyl methacrylate, oxocyclohexylmethyl methacrylate, 3,4-epoxycyclohexylmethyl methacrylate, isobornyl methacrylate and the like; hydroxyl group-containing methacrylic acid esters such as 2-hydroxyethyl methacrylate, 2-hydroxypropyl methacrylate, 3-hydroxypropyl methacrylate, 2-hydroxybutyl methacrylate, 4-hydroxybutyl methacrylate, polyethylene glycol monomethacrylate, polypropylene glycol monomethacrylate, polytetramethylene glycol monomethacrylate, polyethylene glycol polypropylene glycol monomethacrylate, polyethylene glycol polytetramethylene glycol monomethacrylate, polypropylene glycol polytetramethylene glycol monomethacrylate and the like; carboxyl group-containing methacrylic acid esters such as 2-carboxyethyl methacrylate, 2-carboxypropyl methacrylate, 3-carboxypropyl methacrylate, 4-carboxybutyl methacrylate and the like; alkoxy group-containing methacrylic acid esters such as 2-methoxyethyl methacrylate, 2-ethoxyethyl methacrylate, 2-butoxyethyl methacrylate, 2-octoxyethyl methacrylate, 2-lauroxyethyl methacrylate, 3-methoxypropyl methacrylate, 3-ethoxypropyl methacrylate, 3-methoxybutyl methacrylate, methoxy polyethylene glycol monomethacrylate, ethoxy polyethylene glycol monomethacrylate, butoxy polyethylene glycol monomethacrylate, octoxy polyethylene glycol monomethacrylate, lauroxy polyethylene glycol monomethacrylate, stearoxy polyethylene glycol monomethacrylate, methoxy polypropylene glycol monomethacrylate, octoxy polyethylene glycol polypropylene glycol monomethacrylate, phenoxy polyethylene glycol monomethacrylate, phenoxy polypropylene glycol monomethacrylate, nonylphenoxy polyethylene glycol monomethacrylate, nonylphenoxy polyethylene glycol polypropylene glycol monomethacrylate and the like; and glycidyl group-containing methacrylic acid esters such as glycidyl methacrylate, methyl glycidyl methacrylate and the like. Besides the foregoing, other examples of methacrylic acid esters include for instance N,N'-dimethylaminoethyl methacrylate, trifluoroethyl methacrylate, tetrafluoropropyl methacrylate, benzyl methacrylate and the like.

Preferred among the foregoing are methacrylic acid alkyl esters, alicyclic hydrocarbon group-containing methacrylic acid esters, hydroxyl group-containing methacrylic acid esters, carboxyl group-containing methacrylic acid esters, alkoxy group-containing methacrylic acid esters, and glycidyl group-containing methacrylic acid esters, more preferably methacrylic acid alkyl esters, hydroxyl group-containing methacrylic acid esters, alkoxy group-containing methacrylic acid esters and glycidyl group-containing methacrylic acid esters, yet more preferably methacrylic acid alkyl esters and hydroxyl group-containing methacrylic acid esters, and even yet more preferably methacrylic acid alkyl esters. In a case where a methacrylic acid ester is used as a starting monomer of the copolymer of the present invention together with the compound represented by Formula (4) and the compound represented by Formula (5), there may be used one type, or two or more types, of the methacrylic acid esters listed above.

In a case where the compound represented by Formula (6) is polymerized, as a starting monomer, together with the compound represented by Formula (4) and the compound represented by Formula (5), there can be used, as the starting monomer, one, two or more types of the acrylic acid esters or one, two or more types of the methacrylic acid esters listed above, or any selected from the group consisting of one, two or more types of the acrylic acid esters and one, two or more types of the methacrylic acid esters, and preferably for instance one, two or more types of methacrylic acid esters.

In a case where the compound represented by Formula (6) is polymerized, as a starting monomer, together with the compound represented by Formula (4) and the compound represented by Formula (5), the compound represented by Formula (6) may be used in any proportion, and for instance can be caused to react at a proportion of {total amount of [compound represented by Formula (4)] plus [compound represented by Formula (5)]}/[compound represented by Formula (6)]=50/50 to 99/1 (mass ratio), or at a proportion of 60/40 to 99/1 (mass ratio), or at a proportion of 90/10 to 99/1 (mass ratio). Further, the compound represented by Formula (6) can be used and caused to react at the above proportions while maintaining the usage proportion of the [compound represented by Formula (4)] and the [compound represented by Formula (5)] as described above.

The method for producing the copolymer of the present invention using the compound represented by Formula (4) and the compound represented by Formula (5) as starting monomers is not particularly limited, and any known method may be used herein, although the copolymer is preferably produced through emulsion polymerization, since the latter allows the control of particle size and the obtainment of a copolymer having a narrow particle size distribution. Emulsion polymerization facilities the production of particles ranging from small to large depending on the polymerization conditions, and specifically allows the free production of particles having a volume-average particle size of 10 to 350 nm. Preferred among the foregoing are particles having a volume-average particle size of 80 to 250 nm, more preferably of 100 to 200 nm, and yet more preferably of 110 to 170 nm, since within these ranges the copolymer of the present invention exhibits good dispersibility when blended into a coating material. Dynamic light scattering is an ordinary method for measuring particle size distributions, and can be resorted to in the present invention as well to measure, through the use of a particle size distribution meter, the volume-average particle size of the copolymer of the present invention obtained by emulsion polymerization.

To produce the copolymer of the present invention by emulsion polymerization, the compound represented by Formula (4) and the compound represented by Formula (5) may be mixed, for reaction, in their respective total amounts, and may then be allowed to react, or alternatively aliquots of the respective starting monomers may be added as the reaction progresses. In a case where another starting monomer, for instance the compound represented by Formula (6), is also used, the latter may be mixed in the entire amount thereof together with the starting monomers represented by Formulas (4) and (5), and then be allowed to react, or alternatively aliquots of the respective starting monomers can be added as the reaction progresses.

The method used for obtaining the copolymer of the present invention by emulsion polymerization may be any known method of emulsion polymerization; herein for instance the starting monomers i.e. the compound represented by Formula (4), the compound represented by Formula (5) and so forth may be emulsified with water and a surfactant (emulsifier), and then be polymerized using a polymerization initiator. The size of the particles and the particle size distribution of the obtained copolymer are determined by conditions such as the type and concentration of the starting monomers, the reaction temperature, the emulsifier concentration, the initiator concentration and so forth. Therefore, emulsion polymerization can be carried out by appropriately adjusting these conditions, where a given particle size is prescribed.

Emulsifiers that can be used in emulsion polymerization include any known surfactant, for instance non-polymerizable anionic surfactants, non-polymerizable nonionic surfactants, non-polymerizable cationic surfactants, non-polymerizable amphoteric surfactants and polymerizable (reactive) surfactants.

Examples of non-polymerizable anionic surfactants include for instance one type or mixtures of two or more types of higher fatty acid salts, secondary alcohol sulfate ester salts, higher alcohol sulfate ester salts, higher alkyl sulfate ester salts, higher alkyl sulfonate salts, alkyl ether sulfate ester salts, sulfurized olefin salts, sulfated fatty acid salts, sulfonated fatty acid salts, glyceride sulfate ester salts, alkoxyethane sulfonate salts, N-acyl-β-alanine or salts thereof, N-acyl-N-carboxyethyl taurine or salts thereof, N-acyl-N-carboxymethyl glycine or salts thereof, acyl lactate salts, N-acylsarcosine salts, higher fatty acid amide sulfonate salts, phosphate ester salts, sulfosuccinate salts, alkylbenzene sulfonate salts, alkylnaphthalene sulfonate salts, alkylbenzoimidazole sulfonate salts, sulfonate salts of fatty acid esters, sulfate ester salts of fatty acid esters, salts of N-acyl-N-methyl taurine, N-acyl glutamic acid or salts thereof, acylated peptides, acyloxyethane sulfonate salts, sulfate ester salts of fatty acid alkanolamides or alkylene oxide adducts thereof, sulfated oils, polyoxyethylene alkyl ether carboxylic acids, polyoxyethylene alkyl allyl ether carboxylate salts, polyoxyalkylene alkyl ether sulfate ester salts, polyoxyalkylene alkyl phenyl ether sulfate ester salts, polyoxyalkylene alkyl ether carboxylate salts, polyoxyalkylene sulfosuccinate salts, α-olefin sulfonate salts, sulfosuccinic acid esters, α-sulfo fatty acid methyl ester salts, higher fatty acid alkylolamide sulfate ester salts, sodium lauroyl monoethanolamide succinate, N-palmitoylaspartic acid ditriethanolamine, sodium caseinate, triazine compounds and alkyl or alkenylaminocarboxymethyl sulfate salts and the like.

Examples of non-polymerizable nonionic surfactants include for instance polyoxyalkylene alkyl ethers, polyoxyalkylene alkenyl ethers, polyoxyethylene polyoxypropylene alkyl ethers (the addition form of ethylene oxide and propylene oxide may be either random or block), polyethylene glycol propylene oxide adducts, polypropylene glycol ethylene oxide adducts, polyglycerin fatty acids, fatty acid esters or ethylene oxide adducts thereof, propylene glycol fatty acid esters, glycerin fatty acid esters or ethylene oxide adducts thereof, sorbitan fatty acid esters or ethylene oxide adducts thereof, sorbitol fatty acid esters or ethylene oxide adducts thereof, polyoxyethylene sorbitan fatty acid esters, alkyl polyglucosides, fatty acid monoethanolamides or ethylene oxide adducts thereof, fatty acid-N-methyl monoethanolamides or ethylene oxide adducts thereof, fatty acid diethanolamide or ethylene oxide adducts thereof, tetrapolyoxyethylene tetrapolyoxypropylene ethylenediamine condensates (the addition form of ethylene oxide and propylene oxide may be either random or block), polyoxyethylene castor oil hydrogenated castor oil derivatives, polyoxyethylene bees wax/lanolin derivatives, alkanol amides, sucrose fatty acid esters, alkyl (poly)glycerin ethers, polyglycerin fatty acid esters, polyoxyethylene propylene glycol fatty acid esters, polyoxyethylene alkylamines, polyoxyethylene fatty acid amides, polyoxyethylene soy sterol, polyoxyethylene polyoxypropylene phytosterol (the addition form of ethylene oxide and propylene oxide may be either random or block), polyoxyethylene polyoxypropylene pentaerythrityl (the addition form of ethylene oxide and propylene oxide may be either random or block), alkyl ethoxydimethylamine oxides, trioleyl phosphate, polyoxyethylene-60 glyceryl isostearate, polyoxyethylene-3-polyoxypropylene-20 oligosuccinate, oleth-20, ceteth-20, polyethylene glycol fatty acid esters, fatty acid methyl ester ethoxylates, and N-long chain alkyl dimethylamine oxides and Pluronic types.

Examples of non-polymerizable cationic surfactants include for instance alkyl (alkenyl) trimethylammonium salts, dialkyl (alkenyl) dimethylammonium salts, alkyl (alkenyl) quaternary ammonium salts, mono- or di- or trialkyl (alkenyl) quaternary ammonium salts containing an ether group or an ester group or an amide group, long-chain alkoxyalkyl trimethyl ammonium salts, alkyl (alkenyl) pyridinium salts, alkyl (alkenyl) dimethylbenzyl ammonium salts, alkyl (alkenyl) isoquinolinium salts, dialkyl (alkenyl) morpholinium salts, polyoxyethylene alkyl (alkenyl) amine, alkyl (alkenyl) amine salts, polyamine fatty acid derivatives, amyl alcohol fatty acid derivatives, benzalkonium chloride, benzethonium chloride, dicocoylethyl hydroxyethylmonium methosulfate, stearic acid dimethylaminopropylamide, stearic acid dimethylaminoethylamide, stearic acid diethylaminoethylamide, behenic acid dimethylaminopropylamide, coconut fatty acid amidopropyl betaine and the like.

Examples of non-polymerizable amphoteric surfactants include for instance carboxybetaine-type surfactants, sulfobetaine-type surfactants, phosphobetaine-type surfactants, amide amino acid-type surfactants, imidazoline-type amphoteric surfactants, betaine-type surfactants, imidazolinium betaine-type surfactants.

Examples of polymerizable (reactive) surfactants having a double bond in the molecule include those disclosed in, among others, Japanese Patent Publication No. S49-46291, Japanese Patent Laid-Open Nos. S58-203960, S61-222530, S62-100502, S62-104802, S62-11534, S63-23725, S63-91130, S63-319035, H04-256429, H04-50202, H04-50204, H06-239908, H08-041113, H09-031113, H10-120712, 2002-265505, 2002-275115, 2002-301353 and 2003-128709. The technical content in any of these citations may be appropriately incorporated as part of the present description.

Among the above-listed emulsifiers that can be used in emulsion polymerization, it is preferable to use a polymerizable (reactive) surfactant having double bonds in the molecule, since in such a case a copolymer is obtained that has a good weather resistance improvement effect and good water resistance. Among the foregoing, a reactive surfactant represented by Formula (7) below is preferably used, since such a surfactant is suitable for producing the copolymer of the present invention by emulsion polymerization:

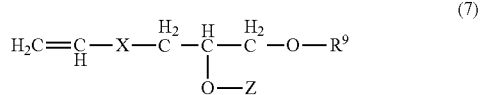

(7)

(wherein $R^9$ represents a C6-30 hydrocarbon group, X represents —$CH_2$—O— or —CO—O—, Z represents -(A-O)$_n$—H or -(A-O)$_p$—Y, A represents a C2-4 alkylene group, n represents a number from 1 to 100, p represents a number from 0 to 100, Y represents —$SO_3M$, —$PO_3M_2$ or —$PO_3MH$, and M represents a hydrogen atom, an alkali metal atom, an alkaline earth metal atom or ammonium.)

In Formula (7), $R^9$ represents a C6-30 hydrocarbon group, examples of which include, for instance; a saturated aliphatic hydrocarbon groups such as hexyl, heptyl, octyl, nonyl, decyl, undecyl, dodecyl, tridecyl, tetradecyl, pentadecyl, hexadecyl, heptadecyl, octadecyl, nonadecyl, icosyl, docosyl, tetracosyl and triacontyl groups (these groups may be linear or branched, and may be primary, secondary or tertiary); unsaturated aliphatic hydrocarbon groups such as hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, icosenyl, docosenyl, tetracosenyl and triacontenyl groups (these groups may be linear or branched, and may be primary, secondary or tertiary); aromatic hydrocarbon groups such as phenyl, toluyl, xylyl, cumenyl, mesityl, benzyl, phenethy, styryl, cinnamyl, benzhydryl, trityl, ethyl phenyl, propyl phenyl, butyl phenyl, pentyl phenyl, hexyl phenyl, heptyl phenyl, octyl phenyl, nonyl phenyl, dinonyl phenyl, decyl phenyl, undecyl phenyl, dodecyl phenyl, styrenated phenyl, p-cumyl phenyl, phenyl phenyl, benzyl phenyls, α-naphthyl, β-naphthyl groups and the like; and alicyclic hydrocarbon groups such as cyclohexyl, cycloheptyl, cyclooctyl, methylcyclopentyl, methylcyclohexyl, methylcyclooctyl groups and the like.

Herein X represents —$CH_2$—O— or —CO—O—, Z represents -(A-O)$_n$—H or -(A-O)$_p$—Y, and A represents a C2-4 alkylene group, for instance an ethylene group, a 1,2-propylene group, a 1,3-propylene group, a 1,2-butylene group, a 1,3-butylene group or a 1,4-butylene group. Further, n represents a number from 1 to 100, and p represents a number from 0 to 100. Further, Y represents —$SO_3M$, —$PO_3M_2$ or —$PO_3MH$, and M represents a hydrogen atom, an alkali metal atom, an alkaline earth metal atom (the alkaline earth metal atom being ½) or ammonium.

The emulsifier can be used in any amount within ordinary amount ranges, but preferably the emulsifier is used in an amount of 0.1 mass % to 20 mass %, more preferably of 0.2 mass % to 10 mass % and yet more preferably of 0.5 mass % to 8 mass % with respect to the starting monomers, since in such cases good water resistance is achieved.

Any polymerization initiator ordinarily used as a radical polymerization initiator can be used herein for emulsion polymerization. Specific examples of polymerization initiators that can be used include for instance ferrous sulfate; persulfates such as ammonium persulfate, potassium persulfate, sodium persulfate and the like; bisulfites such as potassium bisulfite, sodium bisulfite and the like; sulfites such as potassium sulfite, sodium sulfite and the like; peroxides such as benzoyl peroxide, lauryl peroxide, methyl ethyl ketone peroxide, dicumyl peroxide, t-butyl hydroperoxide, hydrogen peroxide, cumene hydroperoxide, t-butyl peroxy-2-ethyl hexanoate, t-butyl peroxyisobutyrate and the like; oil-soluble azo compounds such as azobisisobutyronitrile, 2,2'-azobis(2-methyl butyronitrile), 2,2'-azobis(2,4-dimethylvaleronitrile), 2,2'-azobis(4-methoxy-2,4-dimethylvaleronitrile), 2-phenylazo-4-methoxy-2,4-dimethylvaleronitrile and the like; and azo compounds such as 2,2'-azobis{2-methyl-N-[1,1-bis(hydroxymethyl)-2-hydroxyethyl]propionamide}, 2,2'-azobis{2-methyl-N-[2-(1-hydroxyethyl)]propionamide}, 2,2'-azobis{2-methyl-N-[2-(1-hydroxybutyl)]propionamide}, 2,2'-azobis[2-(5-methyl-2-imidazolin-2-yl)propane] and salts thereof, 2,2'-azobis[2-(2-imidazolin-2-yl)propane] and salts thereof, 2,2'-azobis[2-(3,4,5,6-tetrahydropyrimidin-2-yl)propane] and salts thereof, 2,2'-azobis{2-[1-(2-hydroxyethyl)-2-imidazolin-2-yl]propane} and salts thereof, 2,2'-azobis(2-methylpropionamidine) and salts thereof, 2,2'-azobis(2-methylpropinamidine) and salts thereof, and 2,2'-azobis[N-(2-carboxyethyl)-2-methylpropionamidine] and salts thereof. These polymerization initiators may be used singly or concomitantly in the form of two or more types.

The polymerization initiator can be used in an arbitrary amount within ordinary ranges, but is preferably used in an amount of 0.01 mass % to 10 mass %, more preferably 0.05 mass % to 5 mass % and yet more preferably 0.2 mass % to 2 mass % with respect to the starting monomers of the copolymer of the present invention, since in such cases the reaction is controlled readily.

The copolymer of the present invention can be used in various applications, but is preferably used as a coating material additive that affords a good weather resistance improvement effect. When used as a coating material additive, the copolymer of the present invention preferably has no crosslinked structure, or has little crosslinked structure, since the weather resistance improvement effect of the coating film is then even better. A chain transfer agent may in some instances be used in order to control the crosslinked structure of the copolymer in a normal polymerization reaction. However, the steric hindrance of the compound represented by Formula (4) in the copolymer of the present invention is large; therefore, a copolymer having a low-crosslinked structure that sufficiently elicits the effect of the present invention can be obtained by using the above compound as a starting monomer, and accordingly a chain transfer agent is not required.

So long as the effect of the present invention is achieved, the weight-average molecular weight of the copolymer of the present invention is not particularly limited; herein a copolymer obtained using the compound represented by Formula (4) and the compound represented by Formula (5) as starting monomers exhibits the effect of the present invention.

The method for producing the copolymer of the present invention in accordance with a concrete emulsion polymerization method may involve, for instance, charging firstly into the reaction system, in a nitrogen atmosphere, one twentieth to one half the amount of each copolymerizable starting monomer such as the compound represented by Formula (4) and the compound represented by Formula (5) (in a case where other starting monomers are used, this includes one twentieth to one half the amount of the respective other starting monomer), one fifth to the total amount of the water that is used, one thirtieth to one fifth the amount of the emulsifier that is used, and one twentieth to one half the amount of the polymerization initiator, raising then the temperature from 60° C. to 80° C. while under stirring, and allowing the reaction to proceed from 10 to 30 minutes. Thereafter, the total amount of the remainder of copolymerizable starting monomers, water, emulsifier and polymerization initiator is charged into a dropping funnel, with dropping into the system at 60° C. to 80° C., over 1 to 6 hours. Once dropping is over, an aging reaction is performed for 1 to 6 hours at 60° C. to 80° C., to yield an aqueous dispersion of the copolymer of the present invention having solids of 10% to 80%.

The copolymer of the present invention can also be produced by common radical polymerization, and not necessarily by emulsion polymerization; for instance, the copolymer of the present invention can be obtained by allowing copolymerizable starting monomers to react together with a polymerization initiator, in the presence of a solvent. Although the copolymer of the present invention can be produced both using a solvent and without using a solvent, the viscosity of the system as a whole may rise when no solvent is used, and also the reaction may become non-uniform as the latter progresses locally within the system. Accordingly, it is preferable to use a solvent also in order to allow the reaction to progress homogeneously. The viscosity of the final product is lower when a solvent is used, and thus the final product becomes easier to handle. Depending on the application, the obtained solvent dispersion as-is can also be used as an article.

When the copolymer of the present invention is produced using a solvent in accordance with a method such as the one described above, the copolymer is obtained dissolved in the solvent. Accordingly, in the case of an aqueous dispersion, firstly the solvent may be removed to yield a 100% product, after which the obtained copolymer may be dispersed in water using a dispersant. The dispersants that can be used herein may be for instance identical to the emulsifiers that can be used in the emulsion polymerization described above. The solvent may be removed in accordance with any known method, for instance vacuum distillation, drying through warming, spray-drying, or a combination of the foregoing. In a case where the copolymer is made into an article through dilution in another solvent that is not the solvent used during the reaction, then the article may be obtained by removing the solvent to yield a 100% product, and then adding a diluting solvent to the resulting copolymer. In some instances, however, the viscosity of the obtained copolymer is excessively high and it may be difficult for the solvent used in the reaction to volatilize completely. Accordingly, once the reaction is over, it is preferable to first add, a diluting solvent different from the solvent used in the reaction, and then replacing the solvent by exploiting differences in boiling point, to yield the article.

The solvents that can be used in the reaction and dilution above may be any solvent that is used in radical polymerization. Examples thereof include for instance hydrocarbon-based solvents such as hexane, cyclohexane, toluene, xylene and the like; ester-based solvents such as ethyl acetate, butyl acetate, methyl isobutyl ketone isopropyl myristate, triglycerides and the like; as well as various silicone oils. The polymerization initiator that can be used during the above reaction may be the same as the polymerization initiators listed above as polymerization initiators amenable for use in emulsion polymerization.

The copolymer of the present invention can be used in various applications, but is preferably used as a coating material additive that affords a good weather resistance improvement effect. The copolymer of the present invention can be used in both aqueous coating materials and oil-based coating materials, but is preferably used as an aqueous coating material additive since in that case there is achieved good weather resistance improvement effect and good water resistance. In that case, the copolymer of the present invention is preferably used in the form of an aqueous coating material additive composition resulting from dispersing the copolymer in water to solids in the range of 10% to 80%, and is more preferably used in the form of an aqueous coating material additive composition resulting from dispersing the copolymer in water to solids in the range of 20% to 50%, since handling is made easier in such cases. By thus producing the copolymer of the present invention in accordance with above-described emulsion polymerization, solids can as a result be set freely and the obtained aqueous dispersion as-is can be used as an aqueous coating material additive composition.

The aqueous coating material in which the aqueous coating material additive of the present invention can be used may be an aqueous coating material of a form resulting from making a coating material through the use of a resin that dissolves in water, or may be an aqueous coating material of water dispersion type in which a wide variety of resins having poor water solubility are dispersed in water. These resins for aqueous coating materials are not particularly limited so long as they are resins used in coating materials. Examples thereof include for instance vinyl acetate resins, alkyd resins, acrylic resins, acrylic urethane resins, acrylic silicone resins, melamine resins, urethane resins, epoxy resins, urea resins, phenolic resins, vinyl chloride resins, silicone resins, fluororesins, nylon resins, vinyl chloride resins, styrene butadiene resins, nitrile butadiene resins, petroleum resins, rosin, shellac, linseed oil, boiled oil, soybean oil, castor oil, acetyl cellulose and nitrocellulose. These resins can be used singly or concomitantly in the form of two or more types. The coating material additive of the present invention is preferably used in a coating material in which any one from among vinyl acetate resins, acrylic resins, acrylic urethane resins, urethane resins, epoxy resins, urea resins and phenolic resins is used as a main resin, since in that case the effect of the present invention is readily achieved. More preferably, the coating material additive of the present invention is used in a coating material in which any one from among acrylic resins, acrylic urethane resins, acrylic silicone resins and urethane resins is used as a main resin, and yet more preferably in a coating material in which any one resin from among acrylic resins, acrylic urethane resins and acrylic silicone resins is used as a main resin. In the present description the term main resin denotes the resin of highest content in the coating material. In a case for instance of a coating material having 40 mass % of a urethane resin and 60 mass % of an acrylic resin as resin components, the main resin is the acrylic resin.

When incorporating the copolymer of the present invention into a coating material, the preparation method of the latter is not particularly limited, and for instance the copolymer may be blended into the coating material by dispersing or dissolving, in water or in a solvent, a product obtained by incorporating beforehand the copolymer of the present invention into a coating material resin and uniformly dispersing the whole; alternatively, the copolymer of the present invention may be incorporated together with various additives and the coating material resin, to produce a coating material, or alternatively the copolymer of the present invention may be incorporated later into a coating material, other than the product of the present invention, having been produced out of various additives and a coating material resin. Coating materials come in two types, namely one-pack coating materials and two-pack coating materials. In the case of one-pack coating materials, it suffices that the copolymer of the present invention be blended into the coating material in accordance with any of the methods described above, while in the case of two-pack coating materials that are used through mixing of two liquids, the copolymer of the present invention is preferably incorporated into a base resin contained in the coating material resin. If dispersion of the copolymer of the present invention in the coating material is insufficient, the effect of the present invention may fail to be elicited sufficiently. The copolymer of the present invention is used as an aqueous coating material additive, but is preferably used as a one-pack coating material having an aqueous coating material as a main constituent, since the effect of the present invention can then be achieved readily.

The content of the aqueous coating material additive of the present invention in an aqueous coating material is not particularly limited so long as the desired effect is achieved, but ordinarily the content of the aqueous coating material additive of the present invention is 0.1 to 5.0 parts by mass with respect to 100 parts by mass of the aqueous coating material. Within the above ranges, the content of the aqueous coating material additive of the present invention is preferably 0.5 to 3.0 parts by mass, and more preferably 0.5 to 1.0 part by mass, since in such cases there is achieved an effect commensurate with the addition amount. When the above content is lower than 0.1 parts by mass, an aqueous coating material affording a sufficient weather resistance effect may not always be obtained; if the content of the aqueous coating material additive exceeds 5 parts by mass an effect commensurate with the content may likewise not always be obtained.

Ordinarily, the term coating material denotes a composition made up of a coating material resin, additives, water or a solvent, and a pigment, with the additives and the amounts thereof varying depending on the application. The formulation of the aqueous coating composition containing the aqueous coating material additive of the present invention can include, besides the aqueous coating material additive of the present invention, also various pigments, plasticizers, coalescents, preservatives, fungicides, antifoaming agents, thickeners (viscosity modifiers), leveling agents, dispersants, anti-settling agents, heat resistance improvers, anti-skinning agents, slip agents, desiccants, anti-sagging agents, matting agents, light stabilizers, antioxidants, nonreactive ultraviolet absorbers and the like, in amounts such that the effect of the present invention is not impaired.

In a case where the copolymer of the present invention is used as an aqueous coating material additive, the latter can be used in various uses for coating materials, for instance architectural coating materials, coating materials for vehicles such as automobiles and railcars, marine coating materials, structural coating materials, coating materials for electric machinery, coating materials for metallic articles, coating materials for gardening supplies, furniture coating materials, leather coating materials, model coating materials and the like; however, the copolymer of the present invention is preferably used as an additive for architectural coating materials and coating materials for vehicles such as automobiles and railcars, since these applications often demand weather resistance and water resistance being herein the effect of the present invention.

EXAMPLES

The present invention will be explained next in more specific terms by way of examples. It should be noted however that the present invention is in no way limited by such examples and, without departing from the scope thereof, may accommodate all manner of variations. Unless otherwise stated, the notation "%" in the examples and so forth below refers to mass basis.

The starting monomers used to produce the copolymer are as follows.
<Compound Represented by Formula (4)>
Compound A-1: in Formula (4), $R^1$=$CH_3$ and $R^4$=H; $R^2$ and $R^3$ saturated aliphatic hydrocarbon groups; total 7 carbon atoms in $R^2$ and $R^3$
(VeoVaTM10: by Momentive Performance Materials Japan LLC)
Compound A-2: in Formula (4), $R^1$=$CH_3$ and $R^4$=H; $R^2$ and $R^3$ saturated aliphatic hydrocarbon groups; total 6 carbon atoms in $R^2$ and $R^3$
(VeoVaTM9: by Momentive Performance Materials Japan LLC)
Compound A-3: In Formula (4), $R^1$=H, $R^2$=$C_4H_9$, $R^3$=$C_2H_5$ and $R^4$=H
(VeoVaTMEH: by Momentive Performance Materials Japan LLC)

<Compound Represented by Formula (5)>
Compound B-1: in Formula (5), $R^5$=$CH_3$ and $R^6$=$CH_3$
Compound B-2: in Formula (5), $R^5$=$CH_3$ and $R^6$=H
<Compound Represented by Formula (6): Acrylic Acid Ester>
Compound C-1: in Formula (6), $R^7$=H and $R^8$=$C_4H_9$ (butyl acrylate)
Compound C-2: in Formula (6), $R^7$=H and $R^8$=$C_{12}H_{25}$ (lauryl acrylate)
<Compound Represented by Formula (6): Methacrylic Acid Ester>
Compound D-1: in Formula (6), $R^7$=$CH_3$ and $R^8$=$C_4H_9$ (butyl methacrylate)
Compound D-2: in Formula (6), $R^7$=$CH_3$ and $R^8$=$C_{12}H_{25}$ (lauryl methacrylate)
Compound D-3: in Formula (6), $R^7$=$CH_3$ and $R^8$=$C_6H_{11}$ (cyclohexyl methacrylate)

The emulsifier, initiator and chain transfer agent used are as follows.
<Emulsifier>
Product name: ADEKA REASOAP SR-10 (by ADEKA Corporation) (reactive emulsifier: ether sulfate-type ammonium salt)
<Polymerization Initiator>
Product name: V-50 (by Wako Pure Chemical Industries, Ltd.) [2,2'-azobis(2-methyl-propionamidine)dihydrochloride]
<Chain Transfer Agent>
1-decanethiol Production of Copolymer Aqueous Dispersions:
Copolymer aqueous dispersions Nos. 1 to 23 were produced using the above starting materials. Copolymer aqueous dispersions Nos. 1 to 13 are products of the present invention, and Nos. 14 to 23 are comparative products. Table 1 and Table 2 set out the types and charge amounts (g) of the starting materials used to produce copolymer aqueous dispersions Nos. 1 to 23.

Procedure for producing copolymer aqueous dispersion No. 1:

Herein 1.60 g (one tenth of the total amount) of A-1, 1.60 g (one tenth of the total amount) of B-1, 49.5 g (three quarters of the total amount) of water, 0.09 g (one twentieth of the total amount) of emulsifier and 0.03 g (one tenth of the total amount) of polymerization initiator were charged into the reaction system in a 200 ml reaction flask, in a nitrogen atmosphere; then the temperature was raised from 70° C. to 75° C. while under stirring, and the reaction was left to proceed for 15 minutes. Thereafter, the total amount of the remainder of starting materials, i.e. 14.37 g of A-1, 14.37 g of B-1, 16.5 g of water, 1.684 g of the emulsifier, and 0.29 g of the polymerization initiator, was charged into a dropping funnel, and was dropped into the system at 70° C. to 75° C., over 3 hours. Once dropping was over, an aging reaction was performed for 2 hours at 70° C. to 75° C., to yield copolymer aqueous dispersion No. 1 of the present invention having solids of 34%.

Copolymer aqueous dispersions Nos. 2 to 23 were produced in accordance with the same method as that of copolymer aqueous dispersion No. 1, but by modifying the types of the starting materials. Copolymer aqueous dispersion No. 20 and copolymer aqueous dispersion No. 22 were produced using 1-decanethiol as a chain transfer agent.

The solids content of the obtained copolymer aqueous dispersions and the volume-average particle size of the copolymers are given in Table 1 and Table 2. The volume-average particle size is herein a value obtained through measurement using a zeta potential/particle diameter measuring system ELSZ-1000ZS by Otsuka Electronics Co., Ltd.

TABLE 1

| | | Copolymer aqueous dispersion No. | | | | | | | | | | | | |
|---|---|---|---|---|---|---|---|---|---|---|---|---|---|---|
| | | No. 1 | No. 2 | No. 3 | No. 4 | No. 5 | No. 6 | No. 7 | No. 8 | No. 9 | No. 10 | No. 11 | No. 12 | No. 13 |
| Example | | 1 | 2 | 3 | 4 | 5 | 6 | 7 | 8 | 9 | 10 | 11 | 12 | 13 |
| Starting monomer | A-1 (g) | 15.97 | 20.76 | 28.75 | 15.97 | 20.76 | 28.75 | | | | | 12.78 | 15.97 | 15.97 |
| | A-2 (g) | | | | | | | 20.76 | 28.75 | | | | | |
| | A-3 (g) | | | | | | | | | 20.76 | 28.75 | | | |
| | B-1 (g) | 15.97 | 11.18 | 3.19 | | | | 11.18 | 3.19 | 11.18 | 3.19 | 3.19 | 3.19 | 3.19 |
| | B-2 (g) | | | | 15.97 | 11.18 | 3.19 | | | | | | | |
| | C-1 (g) | | | | | | | | | | | | | |
| | C-2 (g) | | | | | | | | | | | | | |
| | D-1 (g) | | | | | | | | | | | 15.97 | 12.78 | |
| | D-2 (g) | | | | | | | | | | | | | |
| | D-3 (g) | | | | | | | | | | | | | 12.78 |
| Emulsifier (g) | | 1.774 | 1.774 | 1.774 | 1.774 | 1.774 | 1.774 | 1.774 | 1.774 | 1.774 | 1.774 | 1.774 | 1.774 | 1.774 |
| Polymerization initiator (g) | | 0.32 | 0.32 | 0.32 | 0.32 | 0.32 | 0.32 | 0.32 | 0.32 | 0.32 | 0.32 | 0.32 | 0.32 | 0.32 |
| Chain transfer agent (g) | | | | | | | | | | | | | | |
| Water (g) | | 66 | 66 | 66 | 66 | 66 | 66 | 66 | 66 | 66 | 66 | 66 | 66 | 66 |
| Total amount of starting materials (g) | | 100 | 100 | 100 | 100 | 100 | 100 | 100 | 100 | 100 | 100 | 100 | 100 | 100 |
| Emulsifier amount with respect to starting monomers (%) | | 5.55 | 5.55 | 5.55 | 5.55 | 5.55 | 5.55 | 5.55 | 5.55 | 5.55 | 5.55 | 5.55 | 5.55 | 5.55 |
| Polymerization initiator amount with respect to starting monomers (%) | | 1 | 1 | 1 | 1 | 1 | 1 | 1 | 1 | 1 | 1 | 1 | 1 | 1 |
| Copolymer solids (%) | | 34 | 34 | 34 | 34 | 34 | 34 | 34 | 34 | 34 | 34 | 34 | 34 | 34 |
| Volume-average particle size of copolymer (nm) | | 129.7 | 118.8 | 128.3 | 128.5 | 123.2 | 129 | 120.8 | 127.9 | 122.5 | 131.8 | 126.6 | 122.7 | 129.9 |

TABLE 2

| | Copolymer aqueous dispersion No. | | | | | | | | | |
|---|---|---|---|---|---|---|---|---|---|---|
| | No. 14 | No. 15 | No. 16 | No. 17 | No. 18 | No. 19 | No. 20 | No. 21 | No. 22 | No. 23 |
| Comparative Example | 1 | 2 | 3 | 4 | 5 | 6 | 7 | 8 | 9 | 10 |
| Starting monomer A-1 (g) | | | | | | | | | | |
| A-2 (g) | | | | | | | | | | |
| A-3 (g) | | | | | | | | | | |
| B-1 (g) | 15.97 | 11.18 | 3.194 | 15.97 | 15.97 | 11.18 | 11.18 | 3.19 | 3.19 | 15.97 |
| B-2 (g) | | | | | | | | | | |
| C-1 (g) | 15.97 | 20.76 | 28.75 | | | | | | | |
| C-2 (g) | | | | 15.97 | | | | | | |
| D-1 (g) | | | | | 15.97 | 20.76 | 20.76 | 28.75 | 28.75 | |
| D-2 (g) | | | | | | | | | | 15.97 |
| D-3 (g) | | | | | | | | | | |
| Emulsifier (g) | 1.774 | 1.774 | 1.774 | 1.774 | 1.774 | 1.774 | 1.774 | 1.774 | 1.774 | 1.774 |
| Polymerization initiator (g) | 0.32 | 0.32 | 0.32 | 0.32 | 0.32 | 0.32 | 0.32 | 0.32 | 0.32 | 0.32 |
| Chain transfer agent (g) | | | | | | 0.32 | | 0.32 | | |
| Water (g) | 66 | 66 | 66 | 66 | 66 | 66 | 66 | 66 | 66 | 66 |
| Total amount of starting materials (g) | 100 | 100 | 100 | 100 | 100 | 100 | 100 | 100 | 100 | 100 |
| Emulsifier amount with respect to starting monomers (%) | 5.55 | 5.55 | 5.55 | 5.55 | 5.55 | 5.55 | 5.55 | 5.55 | 5.55 | 5.55 |
| Polymerization initiator amount with respect to starting monomers (%) | 1 | 1 | 1 | 1 | 1 | 1 | 1 | 1 | 1 | 1 |
| Copolymer solids (%) | 34 | 34 | 34 | 34 | 34 | 34 | 34 | 34 | 34 | 34 |
| Volume-average particle size of copolymer (nm) | 130.8 | 129.4 | 128.2 | 131 | 130.6 | 131.1 | 130.8 | 130.9 | 131.1 | 129.2 |

Coating Film Evaluation I: Evaluation of Weather Resistance

The weather resistance of the copolymer aqueous dispersions Nos. 1 to 23 when used as an aqueous coating material additive was investigated.

Production of Coating Films for Evaluation

Respective coating films were produced by using aqueous coating compositions Nos. 1' to 23' and aqueous coating compositions Nos. 1" to 23" respectively resulting from incorporating 1.5 parts by mass, and 3.0 parts by mass, of copolymer aqueous dispersions Nos. 1 to 23 into 100 parts by mass of Aqua Gloss (by Kansai Paint Co., Ltd), being a commercially available aqueous coating material, and by using also Aqua Gloss (by Kansai Paint Co., Ltd.) having no copolymer aqueous dispersion added thereto. Each coating film was applied onto a base material (material: stainless steel) using a dedicated 254 μm baker film applicator, followed by curing at room temperature for 4 days, to yield thereafter an evaluation film. Coating films 1' to 23' being coating films produced using aqueous coating compositions Nos. 1' to 23', coating films 1" to 23" being coating films produced using aqueous coating compositions Nos. 1" to 23", and also coating film 24, as a blank, produced using Aqua Gloss (by Kansai Paint Co., Ltd) having no copolymer aqueous dispersion added thereto, were evaluated at the same time.

Evaluation Method

The 60° gloss of each coating film was measured using a Tester QUV/spray (Q-Lab Corporation), to evaluate weather resistance. The measurement conditions are given further on. The resulting value is a numerical value denoting the glossiness of the coating film (the brightness of an object itself as perceived by humans vision, or the degree to which the image of other bodies, reflected on the surface of the object, can be perceived as a result of specular reflection of light striking the surface of the object), such that the higher the numerical value, the higher the weather resistance of the film is deemed to be. The evaluation was based on 60° gloss retention (%), which denotes the degree to which there is preserved, once evaluation is over, a value obtained by measuring the 60° gloss of each coating film before 60° gloss measurement. The values in the present evaluation varied depending on the mixing ratio of the compound represented by Formula (5) (compounds B-1 and B-2) in the copolymer; and accordingly the comparison of evaluation results was performed between instances of identical mixing ratio of these compounds in the copolymer. Specifically, there were compared copolymer aqueous dispersions obtained through mixing in proportions of [starting monomer other than compound represented by Formula (5)]/[compound represented by Formula (5)]=50/50 (mass ratio), 65/35 (mass ratio), and 90/10 (mass ratio).

Measurement Conditions

50° C.×240 min condensation

60° C.×240 min UV exposure

Cycle (ISO 11507)

Measurement time 1500 hours

Evaluation Results of Copolymers Obtained Through Formulation with [Starting Monomer Other Than Compound Represented by Formula (5)]/[Compound Represented by Formula (5)]=50/50 (Mass Ratio)

Table 3 sets out the evaluation results of coating films 1', 4', 14', 17', 18' and 23' produced by using an aqueous coating composition resulting from incorporating 1.5 parts by mass of respective copolymer aqueous dispersions into 100 parts by mass of Aqua Gloss (by Kansai Paint Co., Ltd), being a commercially available aqueous coating material, and Table 4 sets out the evaluation results for coating films 1", 4", 14", 17", 18" and 23" similarly produced using an aqueous coating composition resulting from otherwise incorporating 3.0 parts by mass.

TABLE 3

|  | Ex. 1' | Ex. 4' | Comp. Ex. 1' | Comp. Ex. 4' | Comp. Ex. 5' | Comp. Ex. 10' | Comp. Ex. 11 |
|---|---|---|---|---|---|---|---|
| Coating film | 1' | 4' | 14' | 17' | 18' | 23' | 24 |
| 60° gloss retention (%) 1500 hours | 78 | 77 | 43 | 40 | 61 | 63 | 37 |

TABLE 4

|  | Ex. 1" | Ex. 4" | Comp. Ex. 1" | Comp. Ex. 4" | Comp. Ex. 5" | Comp. Ex. 10" | Comp. Ex. 11 |
|---|---|---|---|---|---|---|---|
| Coating film | 1" | 4" | 14" | 17" | 18" | 23" | 24 |
| 60° gloss retention (%) 1500 hours | 83 | 82 | 46 | 43 | 68 | 68 | 37 |

The results in Tables 3 and 4 revealed that the product of the present invention exhibits better weather resistance than that of the comparative product. It is further found that weather resistance increases with increasing content of the copolymer aqueous dispersion in the aqueous coating material.

Evaluation Results of Copolymers Obtained Through Formulation with [Starting Monomer Other Than Compound Represented by Formula (5)]/[Compound Represented by Formula (5)]=65/35 (Mass Ratio)

Table 5 sets out evaluation results of coating films 2', 5', 7', 9', 15', 19' and 20' produced by using an aqueous coating composition resulting from incorporating 1.5 parts by mass of respective copolymer aqueous dispersions into 100 parts by mass of Aqua Gloss (by Kansai Paint Co., Ltd), being a commercially available aqueous coating material, and Table 6 sets out the evaluation results for coating films 2", 5", 7", 9", 15", 19" and 20" similarly produced using an aqueous coating composition resulting from otherwise incorporating 3.0 parts by mass.

TABLE 5

|  | Ex. 2' | Ex. 5' | Ex. 7' | Ex. 9' | Comp. Ex. 2' | Comp. Ex. 6' | Comp. Ex. 7' | Comp. Ex. 11 |
|---|---|---|---|---|---|---|---|---|
| Coating film | 2' | 5' | 7' | 9' | 15' | 19' | 20' | 24 |
| 60° gloss retention (%) 1500 hours | 78 | 77 | 78 | 81 | 62 | 53 | 54 | 37 |

TABLE 6

|  | Ex. 2" | Ex. 5" | Ex. 7" | Ex. 9" | Comp. Ex. 2" | Comp. Ex. 6" | Comp. Ex. 7" | Comp. Ex. 11 |
|---|---|---|---|---|---|---|---|---|
| Coating film | 2" | 5" | 7" | 9" | 15" | 19" | 20" | 24 |
| 60° gloss retention (%) 1500 hours | 83 | 82 | 83 | 84 | 67 | 40 | 43 | 37 |

The results in Tables 5 and 6 revealed that the product of the present invention exhibits better weather resistance than that of the comparative product, as was the case in the evaluation result of copolymers obtained through formulation with [starting monomer other than compound represented by Formula (5)]/[compound represented by Formula (5)]=50/50 (mass ratio). It is further found that weather resistance of the product of the present invention increases with increasing content of the copolymer aqueous dispersion in the aqueous coating material.

Evaluation Results of Copolymers Obtained Through Formulation with [Starting Monomer Other Than Compound Represented by Formula (5)]/[Compound Represented by Formula (5)]=90/10 (Mass Ratio)

Table 7 sets out the evaluation results of coating films 3', 6', 8', 10', 11', 12', 13', 16', 21' and 22' produced by using an aqueous coating composition resulting from incorporating 1.5 parts by mass of respective copolymer aqueous dispersions into 100 parts by mass of Aqua Gloss (by Kansai Paint Co., Ltd), being a commercially available aqueous coating material, and Table 8 sets out the evaluation results for coating films 3", 6", 8", 10", 11", 12", 13", 16", 21" and 22" similarly produced using an aqueous coating composition resulting from otherwise incorporating 3.0 parts by mass.

TABLE 7

|  | Ex. 3' | Ex. 6' | Ex. 8' | Ex. 10' | Ex. 11' | Ex. 12' | Ex. 13' | Comp. Ex. 3' | Comp. Ex. 8' | Comp. Ex. 9' | Comp. Ex. 11 |
|---|---|---|---|---|---|---|---|---|---|---|---|
| Coating film | 3' | 6' | 8' | 10' | 11' | 12' | 13' | 16' | 21' | 22' | 24 |
| 60° gloss retention (%) 1500 hours | 62 | 60 | 61 | 57 | 53 | 60 | 54 | 36 | 40 | 39 | 37 |

TABLE 8

|  | Ex. 3" | Ex. 6" | Ex. 8" | Ex. 10" | Ex. 11" | Ex. 12" | Ex. 13" | Comp. Ex. 3" | Comp. Ex. 8" | Comp. Ex. 9" | Comp. Ex. 11 |
|---|---|---|---|---|---|---|---|---|---|---|---|
| Coating film | 3" | 6" | 8" | 10" | 11" | 12" | 13" | 16" | 21" | 22" | 24 |
| 60° gloss retention (%) 1500 hours | 62 | 60 | 62 | 74 | 50 | 55 | 51 | 45 | 41 | 47 | 37 |

The results in Tables 7 and 8 revealed that, as was the case in the evaluation result of copolymers obtained through formulation with [starting monomer other than compound represented by Formula (5)]/[compound represented by Formula (5)]=50/50 (mass ratio) and 65/35 (mass ratio), the product of the present invention in the case of the evaluation result of copolymers obtained through formulation with 90/10 (mass ratio) also exhibits better weather resistance than that of the comparative product.

Coating Film Evaluation II: Evaluation of Water Resistance

In a case where various additives are added to the coating material, the water resistance of the coating film may become impaired depending on the additive. Such additives cannot thus be used as aqueous coating material additives. It was assessed whether the water resistance of coating films was impaired or not when using the copolymer aqueous dispersions Nos. 1 to 23 as an aqueous coating material additive.

Production of Coating Films for Evaluation

Respective coating films were produced by using aqueous coating compositions Nos. 1''' to 23''' resulting from incorporating 1.5 parts by mass of copolymer aqueous dispersions Nos. 1 to 23 into 100 parts by mass of Mowinyl 6520 (by Nippon Synthetic Chemical Industry Co., Ltd.) being a commercially available aqueous emulsion, and by using also Mowinyl 6520 (by Nippon Synthetic Chemical Industry Co., Ltd.) having no copolymer aqueous dispersion added thereto. Each coating film was applied onto a base material (material: glass) using a dedicated 51 μm baker film applicator, followed by curing at room temperature for 4 days, to yield thereafter a respective evaluation film. Herein there were used coating films 1''' to 23''', produced using aqueous coating compositions Nos. 1''' to 23''', and coating film 24''', produced using Aqua Gloss (by Kansai Paint Co., Ltd) Mowinyl 6520 (Nippon Synthetic Chemical Industry Co., Ltd.) having no copolymer aqueous dispersion added thereto.

Evaluation Method

The produced coating films were immersed in hot water at 50° C. and were allowed to stand for 2 days. Thereafter, the coating films were removed from the hot water and the appearance of the films was checked visually. Paper having black characters written thereon was placed behind each coating film once the test was over, and the coating film was evaluated on the basis of degree to which the characters were clearly visible. Coating films after the test that preserved transparency, with black characters clearly visible and without change from before to after the test, were graded as excellent (⊚); coating films for which the black characters were visible, although with turbidity in the coating film as compared with that before the test was over, were graded as good (○); coating films in which turbidity occurred and the black characters were not visible, as compared with that before the test was over, were graded as fair (Δ); and coating films which broke or peeled off the base material after the test was over were graded as poor (×). Table 9 sets out the evaluation results of products of the present invention, and Table 10 the evaluation results of comparative products.

TABLE 9

|  | Ex. 1''' | Ex. 2''' | Ex. 3''' | Ex. 4''' | Ex. 5''' | Ex. 6''' | Ex. 7''' |
|---|---|---|---|---|---|---|---|
| Coating film | 1''' | 2''' | 3''' | 4''' | 5''' | 6''' | 7''' |
| Water resistance of coating film | ⊚ | ⊚ | ⊚ | ⊚ | ⊚ | ⊚ | ⊚ |

|  | Ex. 8''' | Ex. 9''' | Ex. 10''' | Ex. 11''' | Ex. 12''' | Ex. 13''' |
|---|---|---|---|---|---|---|
| Coating film | 8''' | 9''' | 10''' | 11''' | 12''' | 13''' |
| Water resistance of coating film | ⊚ | ⊚ | ⊚ | ⊚ | ⊚ | ⊚ |

TABLE 10

| | Comp. Ex. 1''' | Comp. Ex. 2''' | Comp. Ex. 3''' | Comp. Ex. 4''' | Comp. Ex. 5''' | Comp. Ex. 6''' |
|---|---|---|---|---|---|---|
| Coating film | 14''' | 15''' | 16''' | 17''' | 18''' | 19''' |
| Water resistance of coating film | ◎ | ◎ | ◎ | ◎ | ◎ | ◎ |

| | Comp. Ex. 7''' | Comp. Ex. 8''' | Comp. Ex. 9''' | Comp. Ex. 10''' | Comp. Ex. 12 |
|---|---|---|---|---|---|
| Coating film | 20''' | 21''' | 22''' | 23''' | 24''' |
| Water resistance of coating film | Δ | ◎ | Δ | ◎ | ◎ |

The results in Tables 9 and 10 revealed that all the products of the present invention yielded coating films of good water resistance. Likewise, the comparative products exhibited no impairment in water resistance, except for the coating films produced using copolymer aqueous dispersions No. 20 and No. 22, in which a chain transfer agent was utilized during production of the copolymer.

INDUSTRIAL APPLICABILITY

Good water resistance and weather resistance are imparted to an aqueous coating material by using the copolymer of the present invention as an aqueous coating material additive. The copolymer of the present invention is highly useful, because it can be used not only in aqueous coating materials but also in oil-based coating materials, thus being usable in a very wide range of coating fields.

The invention claimed is:

1. A copolymer consisting of unit A represented by Formula (1) and unit B represented by Formula (2):

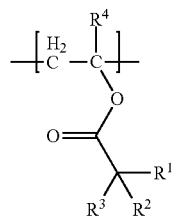

(1)

wherein $R^1$ is a methyl group, $R^4$ is a hydrogen atom, and $R^2$ and $R^3$ each independently represent a hydrocarbon group, with the proviso that a total number of carbon atoms in $R^2$ and $R^3$ is 6 or 7,

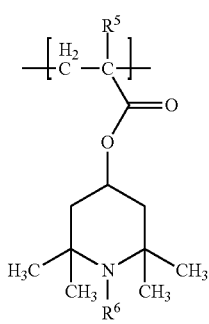

(2)

wherein $R^5$ represents a hydrogen atom or a methyl group, and $R^6$ represents a group selected from the group consisting of C1-20 hydrocarbon groups optionally containing an oxygen atom, C1-20 alkoxy groups, hydrogen atoms, oxygen radicals and hydroxyl groups, wherein a ratio by mass of unit A/unit B=50/50 to 65/35, and wherein the volume-average particle size of the copolymer is 80 to 250 nm.

2. A copolymer consisting of unit A represented by Formula (1), unit B represented by Formula (2), and unit C represented by Formula (3):

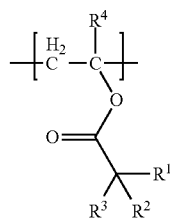

(1)

wherein $R^1$ and $R^4$ each independently represent a hydrogen atom or a methyl group, and $R^2$ and $R^3$ each independently represent a hydrogen atom or a C1-20 hydrocarbon group, excluding cases where two or more groups of $R^1$ to $R^3$ are hydrogen atoms,

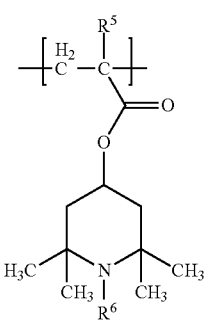

(2)

wherein $R^5$ represents a hydrogen atom or a methyl group, and $R^6$ represents a group selected from the group consisting of C1-20 hydrocarbon groups optionally containing an oxygen atom, C1-20 alkoxy groups, hydrogen atoms, oxygen radicals and hydroxyl groups,

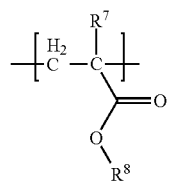
(3)

wherein $R^7$ represents a hydrogen atom or a methyl group, and $R^8$ represents a C1-20 hydrocarbon group optionally having one, two or more substituents selected from the group consisting of hydroxyl groups, alkoxy groups, glycidyl groups, nitro groups, ether groups, carbonyl groups, carboxyl groups, ester groups, cyano groups, amide groups, amino groups and halogen atoms, wherein the unit B represented by Formula (2) is excluded from the unit C represented by Formula (3), wherein a ratio by mass of unit A/unit B=50/50 to 65/35, and a ratio by mass of (unit A+unit B)/unit C=60/40 to 99/1.

3. The copolymer according to claim 1, wherein the copolymer is obtained through copolymerization of a compound represented by Formula (4) and a compound represented by Formula (5):

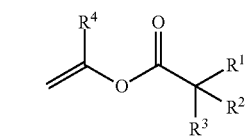
(4)

wherein $R^1$ is a methyl group, $R^4$ is a hydrogen atom, and $R^2$ and $R^3$ each independently represent a hydrocarbon group, with the proviso that a total number of carbon atoms in $R^2$ and $R^3$ is 6 or 7,

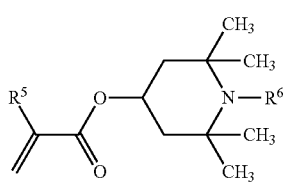
(5)

wherein $R^5$ represents a hydrogen atom or a methyl group, and $R^6$ represents a group selected from the group consisting of C1-20 hydrocarbon groups optionally containing an oxygen atom, C1-20 alkoxy groups, hydrogen atoms, oxygen radicals and hydroxyl groups.

4. The copolymer according to claim 2, wherein the copolymer is obtained through copolymerization of a compound represented by Formula (4), a compound represented by Formula (5), and a compound represented by Formula (6):

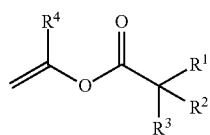
(4)

wherein $R^1$ and $R^4$ each independently represent a hydrogen atom or a methyl group, and $R^2$ and $R^3$ each independently represent a hydrogen atom or a C1-20 hydrocarbon group, excluding cases where two or more groups of $R^1$ to $R^3$ are hydrogen atoms,

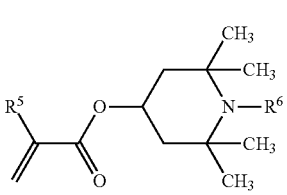
(5)

wherein $R^5$ represents a hydrogen atom or a methyl group, and $R^6$ represents a group selected from the group consisting of C1-20 hydrocarbon groups optionally containing an oxygen atom, C1-20 alkoxy groups, hydrogen atoms, oxygen radicals and hydroxyl groups,

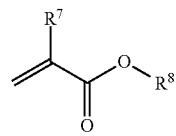
(6)

wherein $R^7$ represents a hydrogen atom or a methyl group, and $R^8$ represents a C1-20 hydrocarbon group optionally having one, two or more substituents selected from the group consisting of hydroxyl groups, alkoxy groups, glycidyl groups, nitro groups, ether groups, carbonyl groups, carboxyl groups, ester groups, cyano groups, amide groups, amino groups and halogen atoms, and wherein the compound represented by Formula (5) is excluded from the compound represented by Formula (6).

5. An aqueous coating material additive, comprising the copolymer of claim 1.

6. An aqueous coating composition, containing 0.1 to 5.0 parts by mass of the aqueous coating material additive of claim 5 with respect to 100 parts by mass of an aqueous coating material.

7. The copolymer according to claim 2, wherein the volume-average particle size of the copolymer is 80 to 250 nm.

8. An aqueous coating material additive, comprising the copolymer of claim 2.

9. An aqueous coating composition, containing 0.1 to 5.0 parts by mass of the aqueous coating material additive of claim 8 with respect to 100 parts by mass of an aqueous coating material.

* * * * *